United States Patent
Karnik et al.

(10) Patent No.: US 10,100,761 B2
(45) Date of Patent: Oct. 16, 2018

(54) METHOD AND SYSTEM FOR SELECTIVE CYLINDER DEACTIVATION

(71) Applicant: Ford Global Technologies, LLC, Dearborn, MI (US)

(72) Inventors: Amey Y. Karnik, Canton, MI (US); Mrdjan J. Jankovic, Birmingham, MI (US); Michael Howard Shelby, Plymouth, MI (US); Pravin Sashidharan, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 15/436,494

(22) Filed: Feb. 17, 2017

(65) Prior Publication Data

US 2018/0238248 A1 Aug. 23, 2018

(51) Int. Cl.
| | | |
|---|---|---|
| *F02D 41/00* | (2006.01) | |
| *F02D 13/02* | (2006.01) | |
| *F02D 17/02* | (2006.01) | |
| *F02D 41/30* | (2006.01) | |
| *F02D 37/02* | (2006.01) | |
| *F02D 41/26* | (2006.01) | |
| *F02D 41/24* | (2006.01) | |

(52) U.S. Cl.
CPC ..... *F02D 41/0087* (2013.01); *F02D 13/0261* (2013.01); *F02D 17/02* (2013.01); *F02D 37/02* (2013.01); *F02D 41/0002* (2013.01); *F02D 41/2406* (2013.01); *F02D 41/26* (2013.01); *F02D 41/3094* (2013.01); *F02D 2200/0408* (2013.01)

(58) Field of Classification Search
CPC .. F02D 41/0087; F02D 17/02; F02D 41/0002; F02D 41/2406; F02D 13/0261; F02D 37/02; F02D 41/3094; F02D 41/26; F02D 2200/0408
See application file for complete search history.

(56) References Cited

U.S. PATENT DOCUMENTS

| | | | |
|---|---|---|---|
| 8,651,091 B2 | 2/2014 | Tripathi et al. | |
| 9,399,962 B2 | 7/2016 | Hagner et al. | |
| 2014/0251282 A1 | 9/2014 | Kotwicki et al. | |
| 2015/0275813 A1* | 10/2015 | Dunn | F02D 41/3094 123/445 |
| 2016/0040614 A1* | 2/2016 | Younkins | F02D 41/266 123/335 |

(Continued)

OTHER PUBLICATIONS

Karnik, Amey Y., et al., "System and Method for Operating Engine Cylinders," U.S. Appl. No. 15/290,579, filed Oct. 11, 2016, 34 pages.

*Primary Examiner* — Long T Tran
*Assistant Examiner* — Xiao Mo
(74) *Attorney, Agent, or Firm* — Julia Voutyras; McCoy Russell LLP

(57) ABSTRACT

Systems and methods are provided for increasing the accuracy of air charge estimation for a cylinder that is selectively deactivatable. A controller may deactivate the cylinder in accordance with a firing pattern selected based on torque demand. An air charge estimate of the firing cylinder is then adjusted based on whether the cylinder was fired or skipped on a previous engine cycle when operating according to the selected firing pattern.

20 Claims, 9 Drawing Sheets

(56) References Cited

U.S. PATENT DOCUMENTS

| | | | |
|---|---|---|---|
| 2016/0116371 A1* | 4/2016 | Chen | F02M 35/1038 |
| | | | 73/114.37 |
| 2016/0131058 A1* | 5/2016 | Younkins | F02D 41/0087 |
| | | | 123/334 |
| 2016/0146139 A1* | 5/2016 | Jankovic | F02D 41/0087 |
| | | | 701/104 |
| 2016/0326969 A1* | 11/2016 | Serrano | F02D 17/02 |
| 2017/0370310 A1* | 12/2017 | Kotwicki | F02D 41/0087 |

* cited by examiner

FIG. 3
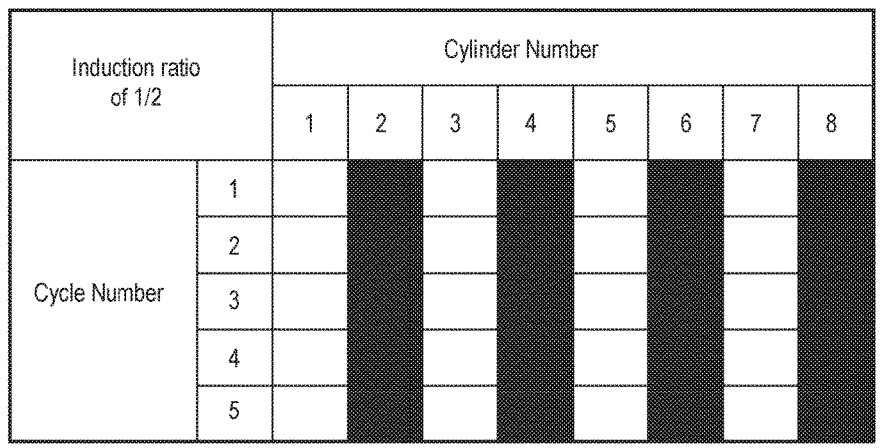
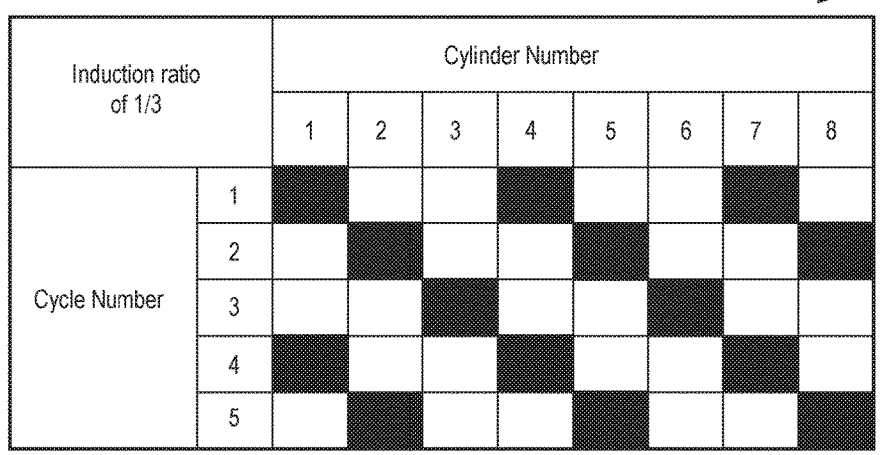
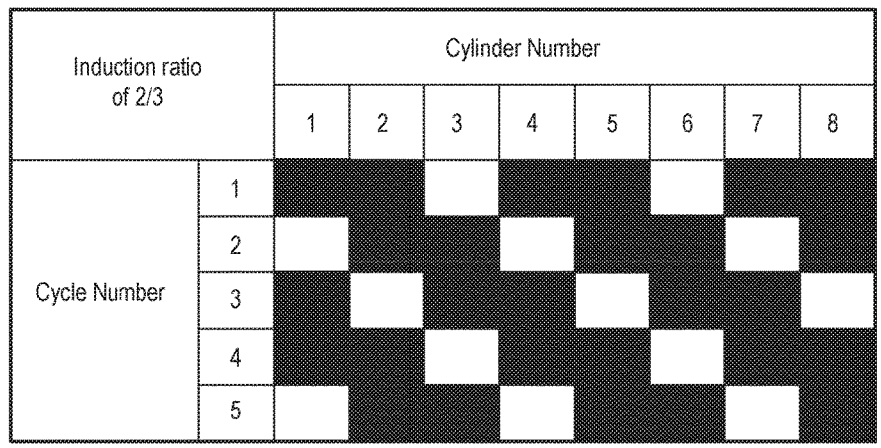

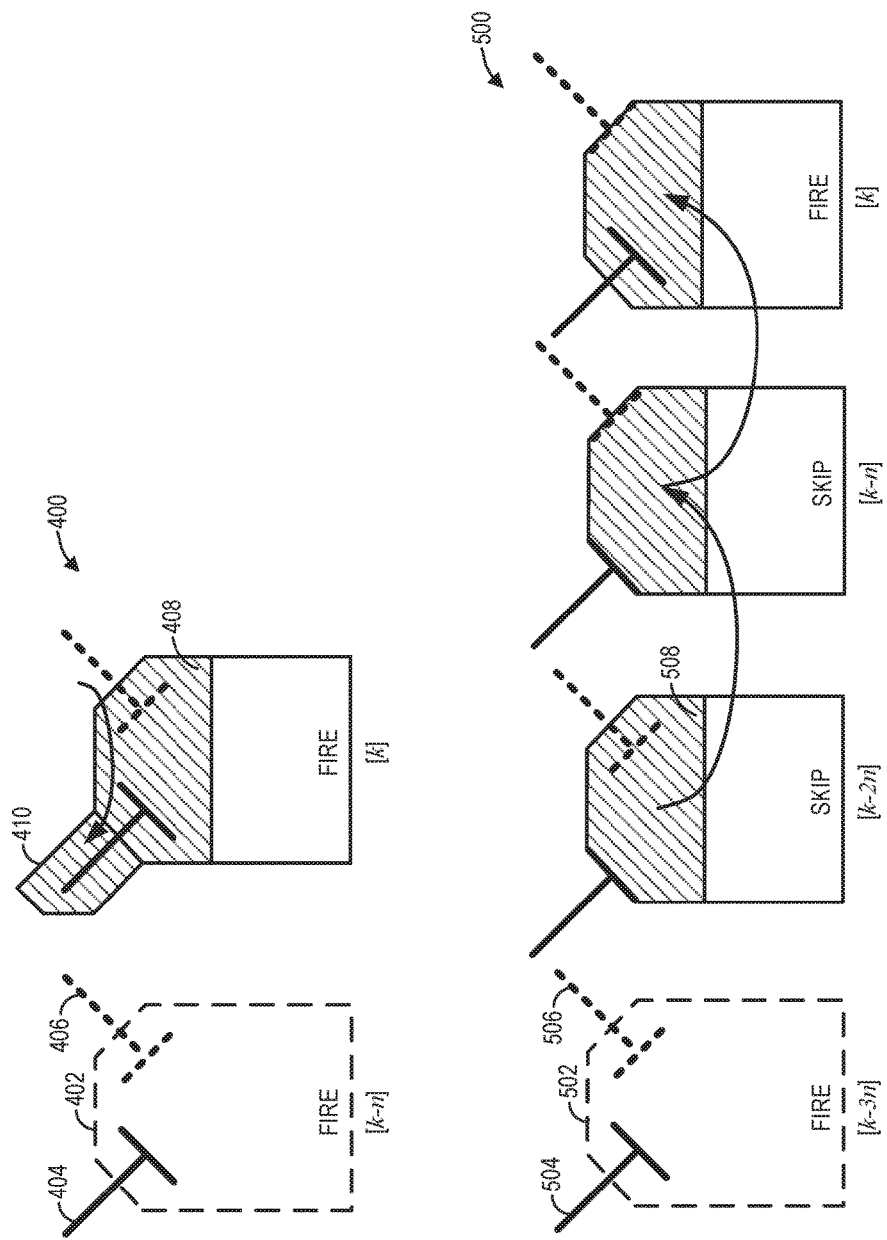

METHOD AND SYSTEM FOR SELECTIVE CYLINDER DEACTIVATION

FIELD

The present application relates to methods and system for selectively deactivating individual engine cylinders in an engine configured with variable cam timing (VCT).

BACKGROUND AND SUMMARY

Engines may be configured to operate with a variable number of active or deactivated cylinders to increase fuel economy, while optionally maintaining the overall exhaust mixture air-fuel ratio about stoichiometry. Therein, a subset of all the engine cylinders may be disabled during selected conditions defined by parameters such as a speed/load window, as well as various other operating conditions including vehicle speed. An engine control system may disable a selected group of cylinders, such as a given bank of cylinders that have cylinder valve deactivators that affect the operation of the cylinder's intake and exhaust valves, and/or through the control of a plurality of selectively deactivatable fuel injectors that affect fueling of the cylinders of the given bank. The other bank of cylinders may not have cylinder valve deactivation capabilities and may continue to fire. Further improvements in fuel economy can be achieved in engines where all the cylinders have deactivation mechanisms so that the specific cylinders that are deactivated can be changed every cycle. For example, the effective displacement of the engine may be varied by skipping the delivery of air and fuel to certain cylinders in an indexed or rolling cylinder firing pattern, also referred to as a "skip-fire" pattern. One example of a skip-fire engine (also referred to as a rolling variable displacement engine (VDE) system) is shown by Tripathi et al. in U.S. Pat. No. 8,651,091. Therein, an engine controller may continuously rotate which particular cylinders receive air and fuel, which cylinders are skipped, and how many cylinders events the pattern is continued for. By skipping air and fuel delivery to selected cylinders, the active cylinders can be operated near their optimum efficiency, increasing the overall operating efficiency of the engine. By varying the identity and number of cylinders skipped, a large range of engine displacement options may be possible.

During cylinder operation, typical engine control methods use volumetric efficiency characterization to estimate the cylinder air charge. This estimation is required prior to every cylinder induction event to determine the amount of fuel to be injected in the corresponding cylinder, as well as to estimate the torque contribution from that cylinder. Volumetric efficiency information may also be used to compute engine air flow and coordinate the operation of air-path actuators, such as an intake throttle. Further, some control methods may use volumetric efficiency information to compute estimated intake manifold pressure from engine air flow, throttle air flow or mass air flow sensor values.

In conventional VDE systems, except during the transition from deactivated to activated, the active cylinders are always inducting and their volumetric efficiency characteristics are similar to the case when all cylinders are inducting. In comparison, for engine systems having rolling VDE capabilities, cylinder aircharge estimation may be difficult due to the numerous firing patterns that are possible. One example approach for estimating the air charge of a cylinder in an engine configured with rolling cylinder firing is shown by Jankovic in US20160146139. Therein, an air charge estimate for a cylinder is adjusted based on whether the subsequent cylinder in the current engine cycle was fired or skipped in the preceding engine cycle. Thus, this approach accounts for the interaction of a cylinder with other cylinders.

However, the inventors herein have identified a potential limitation with such an approach. The above mentioned approach is applicable to conditions where there is valve overlap at the current cylinder thereby allowing other cylinders to influence the residual gas during valve overlap by affecting the instantaneous intake and manifold exhaust pressures. This is applicable to conventional VDE systems where the exhaust is deactivated first followed by the deactivation of the intake valve, resulting in trapping of high pressure exhaust gas. In rolling VDE systems, during cylinder deactivation, an intake valve is deactivated first followed by the deactivation of an exhaust valve of the selected cylinder. Therefore the cylinder completes the exhaust stroke from the prior cycle before the valves are deactivated and the cylinder is isolated. This results in trapping of exhaust gas at a pressure closer to the exhaust manifold pressure. When the cylinder is reactivated, the intake valve opens first, during an intake stroke, and the exhaust valve opens later, near the end of an expansion stroke. This order of deactivation and reactivation of valves results in a significant change in the interactions between the intake manifold and the exhaust manifold resulting in a cylinder-to-cylinder air charge variation. In one example, there may be up to +/−12% variability in cylinder-to-cylinder air flow. If the airflow is not correctly estimated, cylinder-to-cylinder air fuel ratio control may be impacted and there may be significant air fuel ratio imbalance between cylinders. In addition, errors may be introduced in throttle control, residual gas estimation, and torque estimation. The effect may be exacerbated due to the frequent switching between active and deactivated cylinders. As a result, engine operation and exhaust emissions may be adversely affected.

In one example, some of the above issues may be addressed by a method for an engine comprising: adjusting an air charge estimate for a cylinder on a current engine cycle based on an induction pattern history of the cylinder, including an induction state of the cylinder on an immediately previous engine cycle; and injecting fuel to the cylinder in response to the adjusted air charge estimate. In this way, by adjusting an air charge estimate based on a firing history of a cylinder, air charge may be estimated more reliably even as cylinder firing patterns vary.

As one example, each cylinder of an engine may be configured with a selective deactivation mechanism. Based on engine speed and load, one or more of the cylinders may be selectively deactivated, and further, the number and identity of cylinders deactivated on each engine cycle may be varied. For example, an induction ratio that efficiently meets the torque demand may be determined and then a cylinder deactivation pattern may be selected based on the induction ratio wherein active cylinders are evenly spaced for acceptable NVH characteristics. Prior to a cylinder induction event, a volumetric efficiency of the cylinder (to be fired) may be calculated using one of two aircharge calibrations, the aircharge calibration selected based on the most recent induction state of the cylinder. For example, it may be determined if the cylinder to be fired was fired or skipped in the last engine cycle. If the cylinder was skipped, it may be further determined as to how many cycles the cylinder was skipped for (that is, when the last induction event occurred in the same cylinder). If the cylinder was fired in the last cycle, on the current cycle, aircharge may be estimated using a first aircharge characterization. Else, if the cylinder was skipped in the last cycle, on the current cycle, aircharge may be estimated using a second, different aircharge characterization. In the case where the cylinder fired in the previous cycle and is firing in the current cycle, the presence of two consecutive fires results in the intake and exhaust valves being open at the same time, resulting in exhaust residuals reaching the intake runner in addition to occupying the clearance volume (or cylinder volume at the exhaust valve closing). Subsequently during the intake stroke these exhaust residuals are inducted back into the combustion chamber thereby reducing the fresh air trapped in the cylinder. The first aircharge characterization may compensate for this effect. In the case where the cylinder was skipped in the previous cycle and is firing in the current cycle, due to the order of valve deactivation relative to valve reactivation, the intake and exhaust valves are not open at the same time. As a result, there may be no blow-back of exhaust residuals into the intake runner. Only the clearance volume (or the volume of the combustion chamber when exhaust valve closes) is occupied by the residual gas. Thus, a larger amount of air is inducted during the intake stroke as a result of lower amount of residual gas. The second aircharge characterization may compensate for this effect. In some examples, an instantaneous estimate of intake manifold pressure at a time of intake valve closing (IVC) may be used to further enhance the first and second aircharge characterizations. Following the determination of an amount of air entering the cylinder using the selected aircharge characterization, fuel may be accordingly injected into the cylinder.

In this way, aircharge estimation for an engine configured with rolling VDE capabilities is improved. By compensating for the presence or absence of valve overlap based on the induction history of a cylinder in previous cycles, cylinder volumetric efficiency may be calibrated more accurately and with less computation intensity. By using the induction history of a cylinder to update the aircharge estimate for the given cylinder, differences in the exhaust residuals retained in the cylinder due to the differences in intake and exhaust valve operation during cylinder deactivation and reactivation events can be better accounted for. In addition, an intake manifold pressure difference (that drives intake air into the cylinder) arising from the different order of valve operation during cylinder deactivation and reactivation events can be used to more accurately determine the amount of air trapped in a cylinder at BDC. By reducing cylinder-to-cylinder air-fuel imbalances, engine performance and exhaust emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows example cylinder deactivation patterns that may be used for providing different induction ratios, and the resulting induction history for each cylinder.

FIG. 4 shows an example scenario wherein a cylinder that is firing in a current cycle also fired in a previous cycle.

FIG. 5 shows an example scenario wherein a cylinder that is firing in a current cycle was skipped in one or more previous cycles.

DETAILED DESCRIPTION

Figure 1:
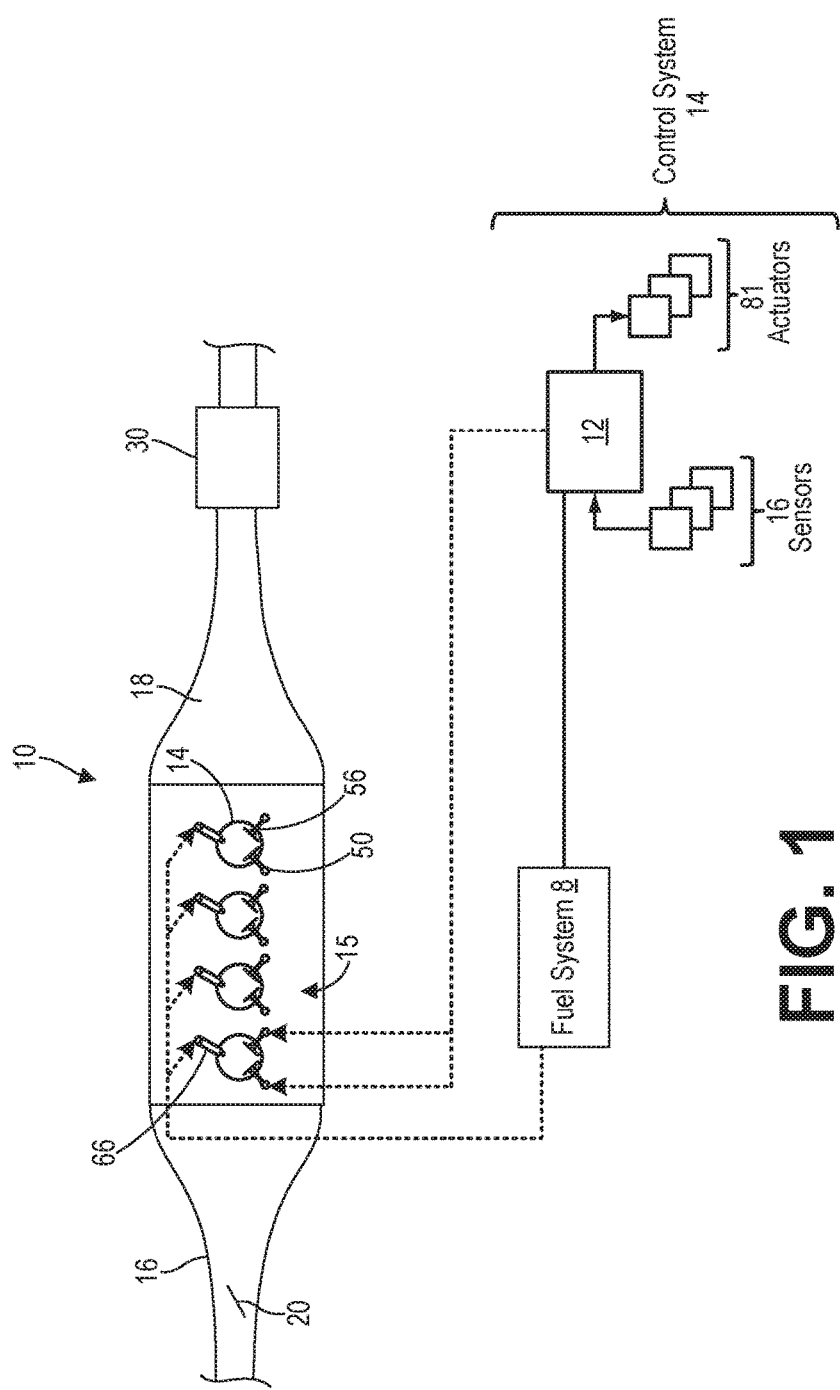
FIG. 1 shows an example embodiment of an engine system layout.
Figure 2:
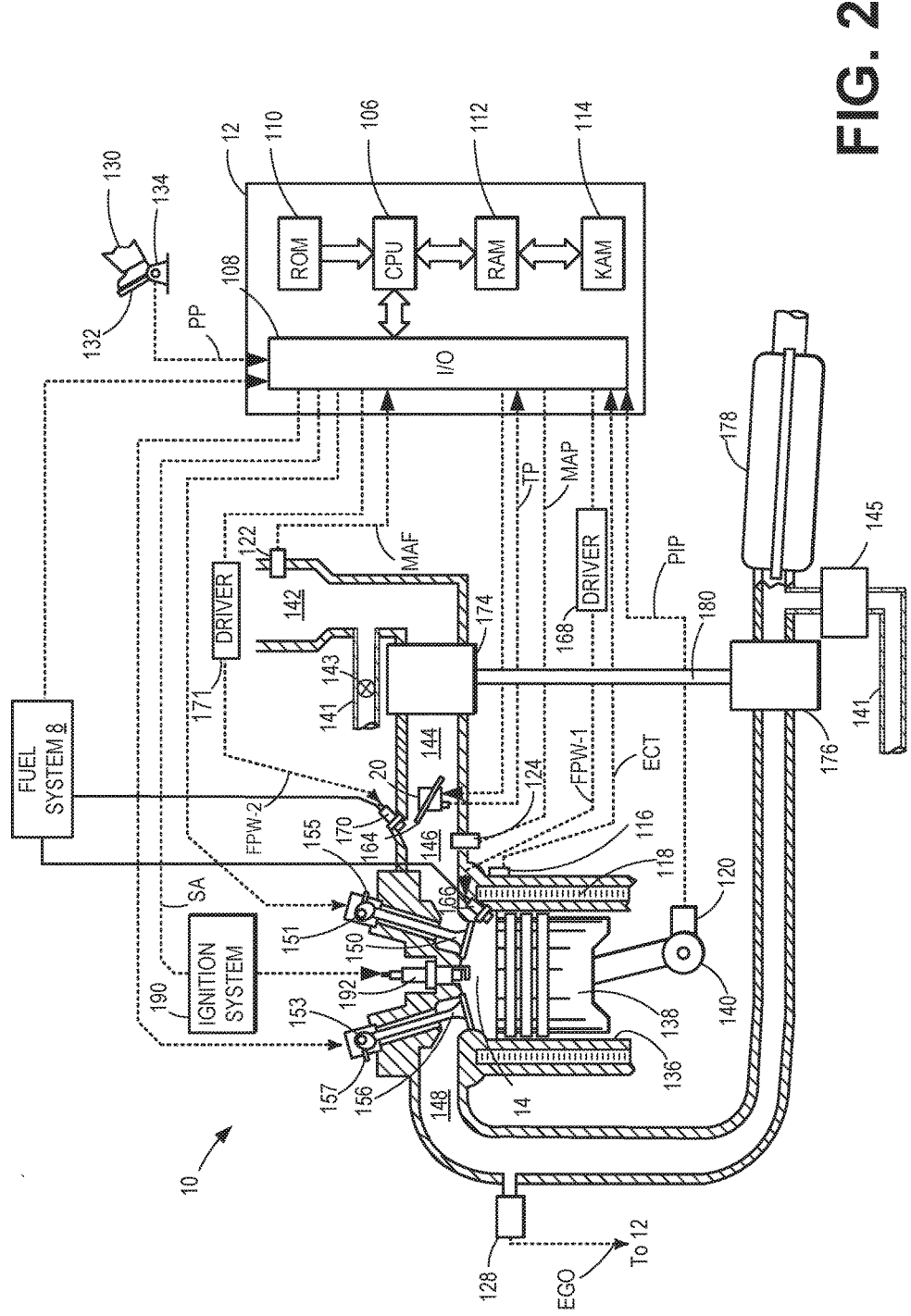
FIG. 2 shows a partial engine view.
Figure 6:
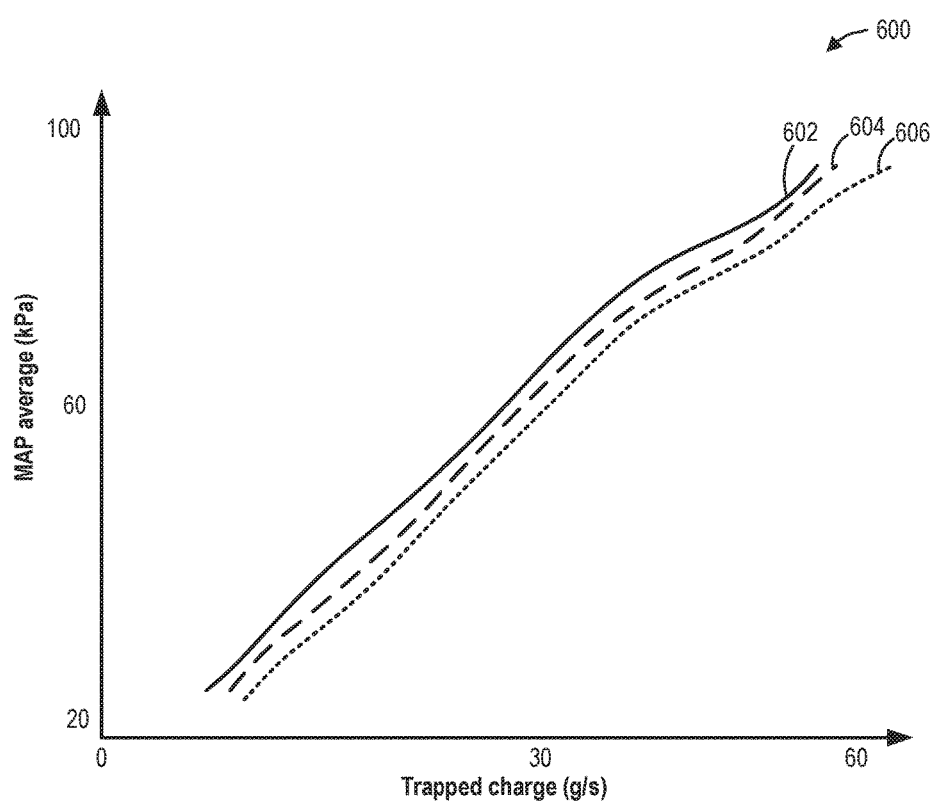
FIG. 6 shows an example variation in charge trapped in a cylinder based on an induction history of the cylinder.
Figure 8:
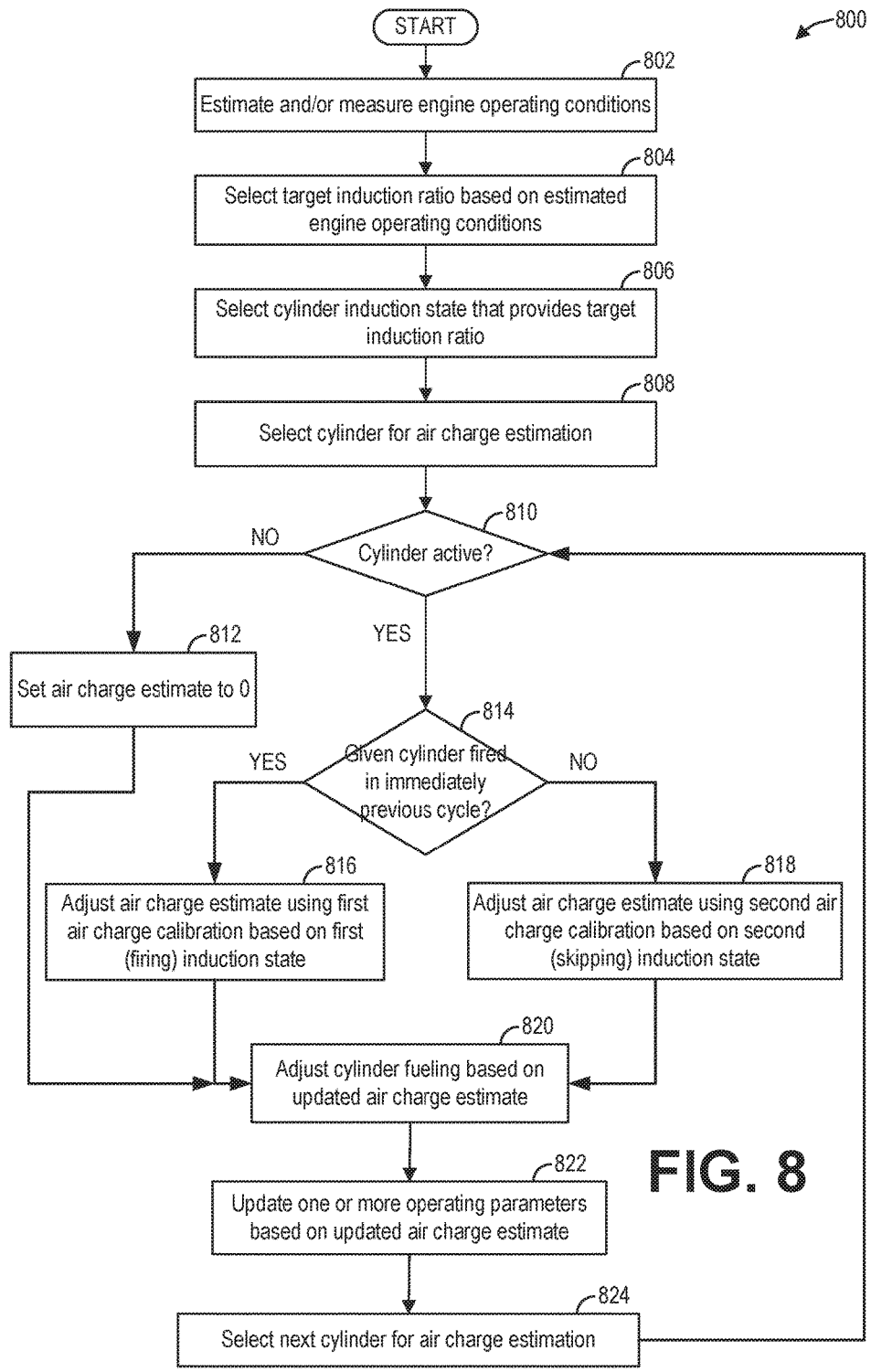
FIG. 8 shows a high level flowchart of an example method for estimating an amount of air entering a cylinder during an induction event based on an induction history of the cylinder.
Figure 9:
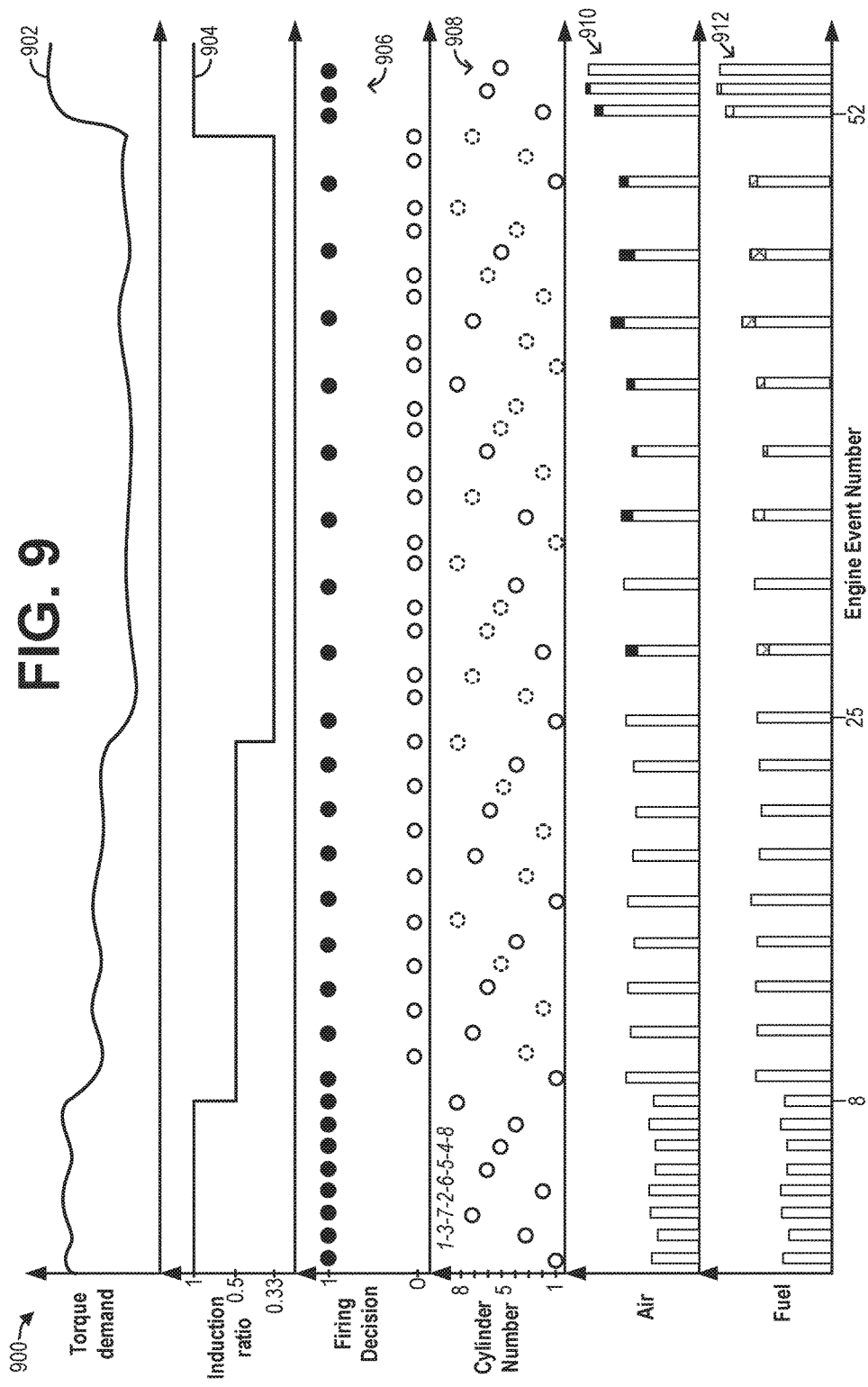
FIG. 9 shows an example engine operation with rolling VDE wherein air and fuel adjustments to a firing cylinder are adjusted based on an induction history of the cylinder.
Figure 10:
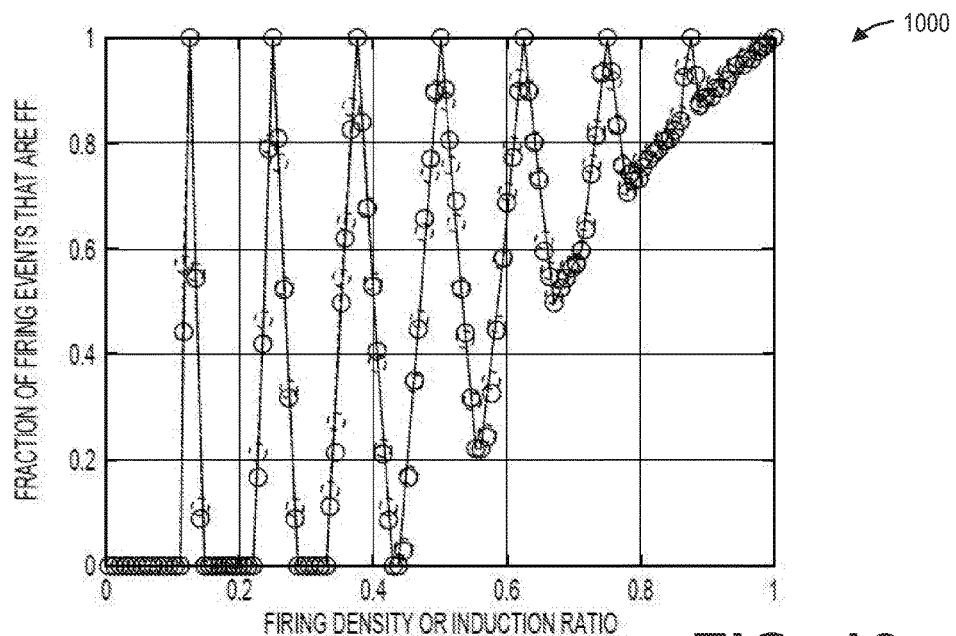
FIG. 10 shows an example function for estimating a fraction of events that are consecutive firing events during engine operation.

Methods and systems are provided for adjusting an air charge estimate for a given cylinder when operating an engine configured for selective cylinder deactivation, such as the engine system of FIGS. 1 and 2. A rolling cylinder deactivation pattern may be selected to provide a target induction ratio, as shown in FIG. 3. An engine controller may perform a control routine, such as the example routine of FIG. 8, to adjust an air charge estimate for a given cylinder based on the firing history of the given cylinder, such as whether the cylinder was fired or skipped in the immediately previous cycle (FIGS. 4-5). The controller may select an air charge calibration, such as one of the calibrations of FIG. 7, to compensate for the amount of trapped charge in a cylinder which varies as a function of the cylinder's induction history (FIG. 6). Example air and fuel adjustments to a firing cylinder based on previous events in the cylinder is shown at FIG. 9. An average air charge estimation may also be performed instead of on an event-by-event basis, as shown at FIG. 10. Further, air charge characterization may be updated to account for changes in manifold pressure and temperature. In this way, errors in engine load due to variation in trapped air charge are reduced.

FIG. 1 shows an example engine 10 having a cylinder bank 15. In the depicted example, engine 10 is an inline-four (I4) cylinder engine with the cylinder bank having four cylinders 14. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on the cylinder bank 15. The number and identity of cylinders deactivated on the cylinder bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors.

In some examples, engine system 10 may have selectively deactivatable (direct) fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific induction (or firing) pattern based on a designated control algorithm. More specifically, selected deactivated working cylinders are not inducting, hence, not firing, while other active working cylinders are inducting, hence, firing. The induction pattern may be defined over one or multiple engine cycles, and would repeat if the same pattern is maintained. The overall pattern may be defined for one cycle of the engine, where for an example of a four-cylinder engine with cylinders having positional numbers 1-4 (with 1 at one end of the line and 4 at the other end of the line) and a firing order of 1-3-4-2 has a pattern of 1-S-4-S, where an "S" represents non-inducting (or deactivation or skipped pattern) and the number means that that cylinder is fueled and fired. Another, different pattern may be S-3-S-2. Still other patterns may be 1-S-S-4, and S-3-4-S, and 1-3-4-S, and 1-S-4-2, and so on. Another case is a pattern that extends over multiple engine cycles, for example 1-S-S-2-S-S-4-S-S-3-S-S, where the patter is changing every cycle to create a rolling pattern. Even if each of these patterns is operated at the same average intake manifold pressure, the cylinder charge for a given cylinder can depend on the induction pattern, and in particular whether the cylinder was firing or non-firing in the previous engine cycle.

As such, for the example of patterns 1-3-4-2, S-3-4-2, 1-3-S-2, and S-3-S-2, cylinder 3's air charge may have a different adjustment factor for each pattern, even at the same average intake manifold pressure. However, rather than simply using different factors for every single combination and every cylinder at every airflow value, the inventors herein have recognized that these exceeding large number of options can be reduced to a more manageable group of adjustments based on whether a firing cylinder fired in the immediately preceding cycle or not. Additional details and operations will be provided below herein. In one example the firing order is fixed by a crankshaft and camshaft of the engine via mechanical connection through a timing chain or belt. While the firing pattern may change in such a configuration, the firing order does not.

Returning to FIG. 1, the engine may utilize spark timing adjustments. Optionally, a spark timing associated with a selected firing of a selected working chamber may also be adjusted based on a firing order or firing history of the selected working chamber. The engine controller 12 may be configured with suitable logic, as described below, for determining a cylinder deactivation pattern based on engine operating conditions.

Engine 10 may operate on a plurality of substances, which may be delivered via fuel system 8. Engine 10 may be controlled at least partially by a control system including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The actuators may include motors, solenoids, etc., coupled to engine actuators, such as an intake throttle, fuel injector, etc. The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Engine controller 12 may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/non-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped.

Since optimal efficiency for a given cylinder is near full output, a lower frequency of firing events may be chosen to reduce output. For example, selectively not inducting every other cylinder would produce half of the power, on average. Spacing the firing events out as evenly as possible tends to minimize vibrations due to the varying torque output. Whether all of the cylinders are included as being deactivated in the selected firing pattern may depend on the fraction of output desired, and other considerations including cylinder temperature.

Example cylinder firing patterns for an 8-cylinder four stroke engine that may be applied to provide a given induction ratio or engine cylinder firing fraction are shown with reference to FIG. 3. It will be appreciated that these are non-limiting examples and that still further firing patterns may be possible for a given induction ratio. The engine cylinder induction ratio is an actual total number of cylinder firing events divided by an actual total number of cylinder compression strokes over a predetermined actual total number of cylinder compression strokes. As used herein, cylinder activation event refers to a cylinder firing with intake and exhaust valves opening and closing during a cycle of the cylinder while a cylinder deactivation event refers to a cylinder not firing with intake and exhaust valves held closed during a cycle of the cylinder. An engine event may be a stroke of a cylinder occurring (e.g., intake, compression, power, exhaust), an intake or exhaust valve opening or closing time, time of ignition of an air-fuel mixture in the cylinder, a position of a piston in the cylinder with respect to the crankshaft position, or other engine related event. The engine event number corresponds to a particular cylinder. For example, engine event number one may correspond to a compression stroke of cylinder number one. Engine event number two may correspond to a compression stroke of cylinder number three. A cycle number refers to an engine cycle which includes one event (activation or deactivation) in each cylinder. For example, a first cycle is completed when an engine event has elapsed in each cylinder of the 8-cylinder engine (a total of eight engine events), in the firing order. The second cycle starts when a second engine event occurs in a first cylinder of the firing order (that is, the ninth engine event counting from an initial engine event).

The decision to activate or deactivate a cylinder and open or close the cylinder's intake and exhaust valve may be made a predetermined number of cylinder events (e.g., one cylinder event, or alternatively, one cylinder cycle or eight cylinder events) before the cylinder is to be activated or deactivated to allow time to begin the process of opening and closing intake and exhaust valves of the cylinder being evaluated. For example, for an eight cylinder engine with a firing order of 1-3-7-2-6-5-4-8, the decision to activate or deactivate cylinder number seven may be made during an intake or compression stroke of cylinder number seven one engine cycle before cylinder number seven is activated or deactivated. Alternatively, the decision to activate or not activate a cylinder may be made a predetermined number of engine events or cylinder events before the selected cylinder is activated or deactivated.

A first example induction pattern for an induction ratio of 1/2 is shown at map 300. An induction ratio of 1/2 implies that for every 2 cylinder events, one cylinder is fire and one is skipped. Inducting cylinders are indicated by a filled rectangle and skipped cylinders are indicated by a blank rectangle. Every other cylinder is selectively not fueled to produce half of the power, on average. Further, the same pattern is applied for each consecutive engine cycle such that cylinders 1, 3, 5, and 7 are skipped on each of the 5 consecutive engine cycles while cylinders 2, 4, 6, 8 are fired on each of the 5 consecutive engine cycles. Specifically, the first engine event corresponds to cylinder number one. Cylinder number one is skipped as indicated by the blank rectangle, and no induction or firing event occurs during the compression stroke of cylinder number one. The second engine event corresponds to cylinder number two. Cylinder number two is active and it does fire during the compression stroke. Firing decisions for the remaining cylinders follow a similar convention. As a result, a firing event in cylinders 2, 4, 6, 8 is preceded by (and followed by) another firing event in the same cylinder. In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/2 may be provided by firing according to the induction pattern S-5-S-2-S-3-S-8. By spacing the firing events out evenly, NVH caused due to the varying torque output is minimized.

It may be observed that the engine's cylinders are activated and fire five times for every ten compression strokes so that the engine follows a desired 0.5 engine cylinder firing fraction. The 0.5 engine cylinder firing fraction is a stationary pattern because the cylinders that are activated do not change from engine cycle to engine cycle. For example, a first set of cylinders (e.g., cylinder numbers 2, 4, 6, and 8) always fire while a second set of remaining cylinders (e.g., cylinder numbers 1, 3, 5, and 7) do not fire at any time during the sequence. For a stationary pattern, any one of the firing cylinders may be selected as a reference cylinder. The sequence initialization may be based on first firing the reference cylinder. In the above example, cylinder number 2 may be the reference cylinder. In another case, cylinder numbers 2, 4, 6, and 8 may skip while cylinder numbers 1, 3, 5, and 7 fire.

A second example induction pattern for an induction ratio of 1/3 (0.3333) is shown at map 310. An induction ratio of 1/3 implies that for every 3 cylinder events, one cylinder is fired while the remaining two are skipped. The pattern of map 320 is based on an eight cylinder four stroke engine having a firing order of 1-2-3-4-5-6-7-8. Inducting cylinders are indicated by a filled rectangle and skipped cylinders are indicated by a blank rectangle. Every third cylinder is selectively fueled to produce a third of the power, on average. As a result of the selected pattern, the cylinders that are skipped on each engine cycle will vary. In the depicted example, cylinder 1 is fired on the first cycle and then skipped for the next two cycles before being fired again on the fourth cycle. Likewise, cylinder 2 is fired in the second cycle and then skipped for the next two cycles before being fired again on the fifth cycle, and so on for the remaining cylinders. In other words, a firing event in each cylinder is preceded by two skipped events in the same cylinder. By spacing the firing events out evenly, NVH caused due to the varying torque output is minimized. In this example, the first engine event corresponds to cylinder number one as indicated by the solid rectangle. Cylinder number one fires during its compression stroke. The second engine event corresponds to cylinder number two which is does not fire during its compression stroke as indicated by the blank rectangle. The third engine event corresponds to cylinder number three which also does not fire as indicated by the blank rectangle. Firing decisions for the remaining cylinders follow a similar convention.

In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/3 may be provided by firing according to the pattern 1-S-S-2-S-S-7-S-S-5-S-S-6-S-S-8-S-S-4-S-S-3-S-S.

It may be observed that the engine's cylinders are activated and fire three times for every nine compression strokes so that the engine follows a 0.3333 engine cylinder firing fraction. The 0.3333 engine cylinder firing fraction is a non-stationary pattern because the cylinders that are activated change from engine cycle to engine cycle. Further, there is no choice for a reference cylinder because the activated cylinders change from engine cycle to engine cycle. All engine cylinders may fire over the course of one or more cylinder cycles for a non-stationary pattern.

A third example firing pattern for an induction ratio of 2/3 is shown at map 320. An induction ratio of 2/3 implies that for every 3 cylinder events, two cylinders are fired while the remaining one is skipped. The pattern of map 320 is based on an eight cylinder four stroke engine having a firing order of 1-2-3-4-5-6-7-8. An induction ratio of 2/3 provides an engine cylinder firing fraction of 0.6777. Inducting cylinders are indicated by a filled rectangle and skipped cylinders are indicated by a blank rectangle. Every third cylinder is selectively not fueled to produce $2/3^{rd}$ of the power, on average. As a result of the selected pattern, the cylinders that are skipped on each engine cycle will vary. In the depicted example, cylinder 2 is fired on the first two cycles and then skipped for the next cycle before being fired again for two cycles. Likewise, cylinder 3 is fired on the second and third cycle and then skipped for the next cycle before being fired again on the fifth cycle, and so on for the remaining cylinders. In other words, a firing event in each cylinder is either preceded by a skipped event or a firing event in the same cylinder. By spacing the firing events out evenly, NVH caused due to the varying torque output is minimized. In this example, the first engine event corresponds to cylinder number one as indicated by the solid rectangle. Cylinder number one fires during its compression stroke. The second engine event corresponds to cylinder number two which is also active and fires during its compression stroke as indicated by the filled rectangle. The third engine event corresponds to cylinder number three which does not fire as indicated by the blank rectangle. Firing decisions for the remaining cylinders follow a similar convention.

In another example, where cylinders 1-8 are arranged as two banks of 4 cylinders each (bank one having cylinders 1-4, and bank two having cylinders 5-8), with a firing order of 1-5-4-2-6-3-7-8, an induction ratio of 2/3 may be provided by firing according to the pattern 1-5-S-2-6-S-7-8-S-5-4-S-6-3-S-8-1-S-4-2-S-3-7-S.

It may be observed that the engine's cylinders are activated and fire six times for every nine compression strokes so that the engine follows a 0.677 engine cylinder firing fraction. The 0.67 engine cylinder firing fraction is a non-stationary pattern because the cylinders that are activated change from engine cycle to engine cycle. Further, there is no choice for a reference cylinder because the activated cylinders change from engine cycle to engine cycle. All engine cylinders may fire over the course of one or more cylinder cycles for a non-stationary pattern.

In this way, by adjusting the cylinder pattern of individual cylinder valve mechanisms and individual cylinder fuel injectors, a desired engine output can be provided by operating fewer cylinders more efficiently, thereby improving fuel economy.

Prior to an induction event in a cylinder, controller 12 may estimate an amount of air charge in the cylinder and adjust fueling to the cylinder accordingly. The inventors herein have recognized that multiple factors may affect an in-cylinder air charge estimate. For example, in-cylinder air charge for a cylinder may be affected by an intake manifold pressure near the top dead center (TDC) and the bottom dead center (BDC) due to interference from other cylinders. For example, interference near TDC is relevant when there is valve overlap and the residual gases back-flow. This is due to the phenomenon that the back flow into the intake runner depends upon the instantaneous pressure difference between the intake and the exhaust manifold pressures. The interference will change based upon the induction decision for the immediately previous cylinder event, for example, a skip decision for the previous cylinder in that will cause an increase in the intake manifold pressure, while a fire (or induct) decision will cause the opposite effect. Air charge estimate may be further affected by exhaust manifold pressure on a given bank due to cylinder events on the same bank.

Air charge estimate may be further affected by positive valve overlap between a given cylinder event and a previous event in the same cylinder. As elaborated with reference to FIGS. 3-4, due to differences in the order of intake and exhaust valve deactivation and reactivation, a degree of TDC interference may be affected based on whether a given firing cylinder was skipped or fired during an immediately previous event in the same cylinder.

Another example of interference is near the BDC, which may be independent of the valve overlap, and may occur due to one or more immediately consecutive cylinder firing events in the engine cycle in accordance with the firing order. For example, a fire decision for the next cylinder event may cause the intake pressure to decrease when the current cylinder piston is near BDC, and hence reduce the air trapped in the current cylinder when it reaches BDC.

Air charge estimate may also be further affected by an amount of heat transfer from a combustion event to a cylinder. A degree of heat transfer (or heat loss from a cylinder) may be affected by the number of combustion events that have elapsed in a given cylinder since a last firing event in the given cylinder (that is, based on the number of combustion events that were skipped in a given cylinder). A method for adjusting an air charge estimate for a given cylinder is described herein with regard to FIG. 8. The method addresses the effect of the presence or absence of valve overlap due to the induction history (or firing history) of a cylinder in previous cycles. The method uses two different aircharge calibrations, based on two different induction states of a cylinder, for calculating volumetric efficiency, thereby simplifying air charge estimation. By selecting one of the calibrations based on the induction history of a cylinder, the need to create independent characterizations for each induction ratio (or induction pattern) of an engine is reduced, thereby reducing the computation and memory intensity needed. In addition, errors in air-charge estimation during transition between induction ratios is reduced.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injector hole than the other. Other differences include, but are not limited to, different spray angles, different operating temperatures, different targeting, different injection timing, different spray characteristics, different locations, etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more of pressure, temperature, and concentration of the exhaust gas.

Controller 12 is shown in FIG. 1 as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

The controller 12 receives signals from the various sensors of FIGS. 1-2 and employs the various actuators of FIGS. 1-2 to adjust engine operation based on the received signals and instructions stored on a memory of the controller. For example, the controller may select a cylinder deactivation pattern that provides a target induction ratio for the given operator torque demand and send a control signal to selectively disable fuel injectors and valves of defined cylinders for the selected induction pattern. Further, based on the pattern, the controller may adjust the air flow estimate for a firing cylinder, and send a pulse width signal to a fuel injector of the firing cylinder that is adjusted as a function of the adjusted air flow estimate.

FIGS. 4-5 depict example valve overlap scenarios that can affect cylinder air charge and volumetric efficiency estimation. FIG. 4 depicts a first valve overlap scenario at map 400, also referred to herein as a fire-fire (or FF) scenario. Cylinders are depicted at 402, cylinder intake valves are depicted at 404 (solid line) and exhaust valves are depicted at 406 (dashed line). A cylinder clearance volume (or volume at exhaust valve closing) is depicted by shaded region 408. A current firing event in the cylinder is indicated at cylinder event [k] (solid line) and an immediately previous event in the same cylinder is indicated at cylinder event [k−n] (dashed line). It will be appreciated that for the given nomenclature, k is the current event, and n is the number of cylinders.

An induction pattern is selected wherein the same cylinder fires on consecutive events. When a cylinder is fired on any given engine cycle, the intake valve of the cylinder is activated open before the exhaust valve is activated open. Due to two consecutive firing events in the same cylinder, the intake and exhaust valves are open at the same time resulting in residual gases (depicted by a curved arrow) reaching intake runner 410. Map 400 shows the intake and exhaust valve events at top dead center. The exhaust valve lifts since the previous cycle was a FIRE for this cylinder, and the intake valve lifts because the cylinder will FIRE in the current cycle. An engine controller may characterize the FIRE-FIRE event via mapping of the air charge for the FIRE-FIRE event by running one of a plurality of stationary patterns. The controller may apply a first aircharge characterization or air charge calibration for a first induction state including a firing event immediately preceding a given firing event in a given cylinder. When considering an induction ratio or firing frequency, the controller may estimate it as the frequency with which a particular cylinder will fire. However, in a stationary pattern, such as the pattern shown with reference to map 300 of FIG. 3, the same cylinders will be firing. Stationary induction patterns may be used for the following induction ratios: 1/8, 1/4, 3/8, 1/2, 5/8, 3/4, 7/8, and 1 for an 8 cylinder engine.

An example of a stationary pattern that results in an induction ratio of 1/8 is FSSSSSSS. An example of a stationary pattern that results in an induction ratio of 1/4 is FSSSFSSS. An example of a stationary pattern that results in an induction ratio of 3/8 is FSFSSFSS. An example of a stationary pattern that results in an induction ratio of 1/2 is FSFSFSFS. An example of a stationary pattern that results in an induction ratio of 5/8 is FSFFSFSF. An example of a stationary pattern that results in an induction ratio of 3/4 is FFFSFFFS. An example of a stationary pattern that results in an induction ratio of 7/8 is FSFFFFFF. An example of a stationary pattern that results in an induction ratio of 1 is FFFFFFFF.

FIG. 5 depicts a second valve overlap scenario at map 500, also referred to herein as a skip-fire (or SF) scenario. Cylinders are depicted at 502, cylinder intake valves are depicted at 504 (solid line) and exhaust valves are depicted at 506 (dashed line). A cylinder clearance volume (or volume at exhaust valve closing) is depicted by shaded region 508. A current firing event in the cylinder is indicated at cylinder [k] (solid line) and immediately previous events in the same cylinder are indicated at cylinder events [k−n], [k−2n], and [k−3n] (that last being a dashed line). It will be appreciated that for the nomenclature, k is the current event, and n is the number of cylinders.

An induction pattern is selected wherein a cylinder firing event in a current cycle is preceded by a skip event in the immediately previous cycle for the same cylinder. When a cylinder is skipped on any given engine cycle, the intake valve of the cylinder is deactivated (closed) before the exhaust valve is deactivated (closed) and fuel is selectively deactivated. This results in the absence of intake and exhaust valves being open at the same time when a cylinder fires on a current engine cycle and is skipped on the immediately previous engine cycle. With the previous cycle being a SKIP event, the exhaust valve will not be open at the intake TDC of the current event and hence there will be no blow-back of the gases from the exhaust into the intake. The residual gas will be contained only in the clearance volume 508 and with the current cycle being a FIRE event, the intake valve opens and fresh air will occupy the space that is not occupied by the residual gas in the combustion chamber. The amount of residual gas retained will depend upon the last time the exhaust valve was open, i.e. the last time the cylinder fired (at cylinder event [k−3n], dashed line). Since that fire-event ([k−3n]) in that cycle was followed by a skip-event in the next cycle (at cylinder event [k−2n]), the intake valve is not open and hence the residual gas is restricted to the clearance volume.

An engine controller may characterize the depicted SKIP-FIRE event via mapping of the air charge for the SKIP-FIRE event by running, for example, a 1/3 pattern wherein each cylinder goes through 2 skips prior to a fire event, and the pattern is evenly distributed and uniform. The controller may apply a second aircharge characterization or air charge calibration (different from the first aircharge) for a second induction state including a skipping event immediately preceding a given firing event in a given cylinder. Since 1, 1/2 and 1/4 are all stationary patterns, it may be advantageous to map out the 1/3 pattern where every fire event is preceded by a skip event in the previous cycle. Another alternative is to use a pattern spread over two cycles such as FSFSFSSFSFSFSF, which toggles every cylinder between activated and deactivated every other cycle.

As such, in conventional VDE, when a cylinder is commanded to be deactivated, the exhaust valve of the cylinder is held closed on the exhaust stroke (the intake valve closes on the preceding intake stroke), such that the cylinder does not complete its combustion cycle. As a result, high pressure exhaust is trapped in the cylinder. In skip-fire VDE, as disclosed in FIGS. 4-5, when a cylinder is commanded to be deactivated, the exhaust valve of the cylinder is opened on the exhaust stroke so that the cylinder can complete its combustion cycle. Then, on the next event for that cylinder, both the intake and the exhaust valves are held closed. As a result, when a skipped event is followed by a firing event, there is no valve overlap since the intake valve is opened (on the firing event) after the exhaust valve is closed (on the skipped event). In comparison, when a firing event is followed by another firing event, there is valve overlap since the intake valve of the cylinder is opened (on a current firing event) before the exhaust valve of the cylinder is fully closed (on the preceding firing event).

Aircharge characterization is required for and prior to each induction event to calculate the appropriate fuel to be injected in the firing cylinder. As elaborated herein, an engine controller may adjust an air charge estimate for a cylinder on a current engine cycle based on an induction history of the cylinder, including an induction state of the cylinder on an immediately previous engine cycle (which may be a firing event or a skipping event, as discussed with reference to FIGS. 4-5). The controller may then inject fuel to the cylinder in response to the adjusted air charge estimate. As elaborated herein, this is achieved for rolling VDE using two different aircharge characterizations that are obtained by steady state mapping of the engine. The adjusting may include estimating an amount of air charge entering the cylinder responsive to a first air charge characterization when the cylinder is fired on the current engine cycle and fired on the immediately previous engine cycle. The first air charge estimation may be mapped in accordance with the induction history of the cylinder being a stationary pattern of cylinder deactivation, wherein the cylinder is repeatedly fired in the stationary pattern. For example, a first curve or characterization corresponding to a Fire-Fire scenario (f_FF) may be obtained by running any one of the stationary patterns (e.g. induction ratio of 1 or 0.5).

The adjusting may further include estimating an amount of air charge entering the cylinder responsive to a second, different air charge characterization when the cylinder is fired on the current engine cycle and skipped on the immediately previous engine cycle. The second air charge estimation may be mapped in accordance with the induction history of the cylinder being a non-stationary pattern of cylinder deactivation, wherein the cylinder is intermittently fired in the non-stationary pattern such that each firing cylinder is preceded by a skipped event for a given cylinder in a previous engine cycle (that is, the same cylinder that is fired in a current engine cycle is skipped in an immediately previous engine cycle). For example, a second curve or characterization corresponding to a Skip-Fire scenario (f_SF) may be obtained by running the induction ratio of 1/3. The controller may also update a buffer for a skipping cylinder in order to capture the appropriate behavior. The intake and exhaust valves of the cylinder may operate with positive valve overlap at top-dead-center of an exhaust stroke of the previous engine cycle when the cylinder is fired on the current engine cycle and fired on the immediately previous engine cycle, and the first characterization may include increasing cylinder air charge by a first amount to compensate for a relatively higher exhaust pressure and increased blow-back of exhaust into an intake runner of the cylinder. In comparison, the intake and exhaust valves of the cylinder may operate with no valve overlap at top-dead-center of an exhaust stroke of the previous engine cycle when the cylinder is fired on the current engine cycle and skipped on at least the immediately previous engine cycle, and the second characterization may include increasing cylinder air charge by a second amount (different from the first amount) to compensate for a relatively lower blow-back of exhaust into the intake runner of the cylinder. In one example, the second amount is larger than the first amount at a given manifold pressure. Further, the second amount may be adjusted based on the induction history of the cylinder including a number of engine cycles elapsed since a last firing of the cylinder, the second amount increased as the number of engine cycles elapsed increases.

An example mapping is shown with reference to FIG. 6. Map 600 depicts average manifold intake pressure (MAP) plotted versus the trapped aircharge (multiplied by 8) for the firing cylinders.

The x axis values represent: x=(Total Airflow)/(Induction Ratio) [in g/s]

The y axis values represent: y=Intake Pressure [kPa]

Plot 602 represents a stationary pattern corresponding to induction ratio of 1/2, while plot 606 shows the rolling pattern with induction ratio for 1/3. It will be appreciated that stationary patterns corresponding to induction ratios of 1 and 1/4 will cluster around plot 602. Plot 604 represents an induction ratio of 2/3, which results in an F-F-S-F-F-S case that includes both the cases of FF and SF.

In particular, at an induction ratio of 2/3, each cylinder fires twice before it is skipped once (firing pattern in a given cylinder is S-F-F-S-F-F-S). Therefore each firing cylinder spends half the time firing in FF mode (fire-fire) and the remaining half firing in SF mode (S-F). The times when the firing cylinder is in the FF mode, the first air charge characterization is applicable, while the times when the firing cylinder is in the SF mode the second air charge characterization is applicable. The resulting average air charge characterization for an induction ratio of 2/3 (plot 604) falls in between the first air charge characterization for an induction ratio that results in a stationary pattern (for example 1 or 1/2 (FF mode, plot 602)) and the second air charge characterization for an induction ratio of 1/3 (SF mode, plot 606).

Figure 7:
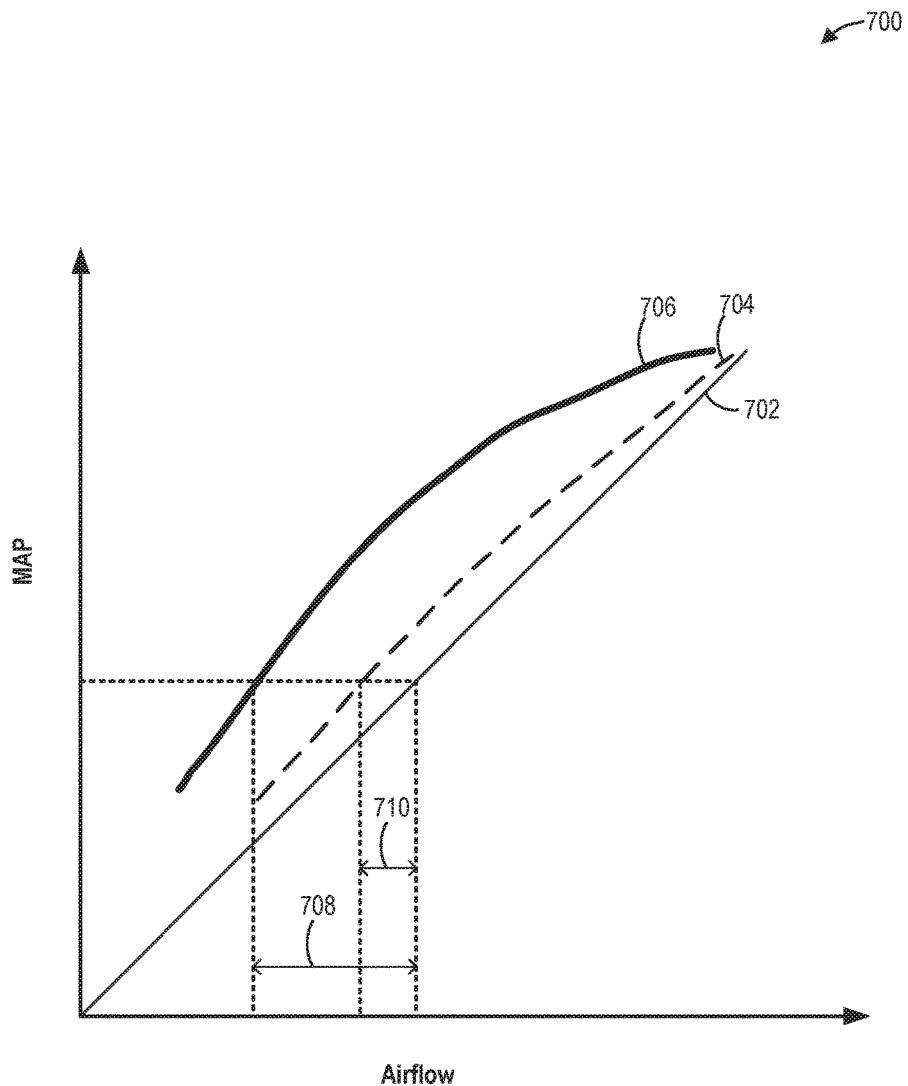
FIG. 7 shows example aircharge characterizations calibrated based on the induction history of a cylinder, according to the present disclosure.

Example curves corresponding to the first and second air charge characterizations are shown with reference to map 700 of FIG. 7. Line 702 depicts a theoretical maximum volumetric efficiency line ignoring residual gas in the combustion chamber. Curve 706 depicts a first air charge characterization for a fire-fire (FF) scenario taking into account valve overlap and residual transfer during positive valve overlap. Curve 704 depicts a second air charge characterization for a skip-fire (SF) scenario taking into account valve overlap and retention of residuals in a clearance volume of a cylinder. The air amount estimated via the second characterization is larger than the air amount estimated by the first characterization at a given manifold air flow or air pressure. This is because the first characterization accounts for the presence of less air being inducted into a cylinder when a firing event precedes another firing event. In such a scenario, residuals blown back into (the larger volume of) an intake runner during a first firing event are inducted back into the cylinder during the intake stroke of a second firing event, immediately following the first firing event. In comparison, the second characterization accounts for the presence of more air being inducted into a cylinder when a skipped event precedes a firing event. In such a scenario, residuals are not blown back into an intake runner, but instead a smaller amount of residuals are held in the (smaller) clearance volume of the cylinder during a skipped event are inducted back into the cylinder during the intake stroke of a second firing event, immediately following the first firing event. Consequently, more fresh air is drawn into the cylinder.

A distance 708 between curve 706 and line 702 represents the amount of residual gases retained in the cylinder in the FF mode. As such, a volumetric efficiency estimate may have an error that is a function of distance 708 if the residuals are not accounted for in the FF mode. A distance 710 between curve 704 and line 702 represents the amount of residual gases retained in the cylinder in the SF mode. As such, a volumetric efficiency estimate may have an error that is a function of distance 706 if the residuals are not accounted for in the SF mode.

In one example, the first air charge characterization increases the intake air amount by increasing the opening of a throttle in the intake runner.

It will be appreciated that while both the first and second air charge characterization increase the amount of air inducted into a cylinder based on the amount of exhaust residuals inducted, as indicated at FIG. 7, at a given MAP, the manifold airflow decreases during the first air charge characterization so the intake pressure has to be increased (e.g., by increasing the opening of the throttle in the intake runner) to achieve the same airflow. Thus, at a given MAP, the first air charge characterization decreases the airflow from the base value (depicted by curve 702 and based on the ideal volumetric efficiency mapping) by a first amount while the second air charge characterization decreases the airflow from the base value by a second amount, the second amount smaller than the first amount (such that the air flow realized by the first characterization is smaller than the air flow realized by the second characterization, at a given MAP). Once these curves are obtained the aircharge may be calculated at each event using the steps described in method 800 of FIG. 8. Turning now to FIG. 8, a method 800 for accurately estimating an intake aircharge before a cylinder event is shown. The method enables cylinder fueling to be accurately estimated. In addition, cylinder torque may be reliably determined, thereby reducing cylinder-to-cylinder torque and air-fuel ratio imbalances. Instructions for carrying out method 800 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 802, the method includes estimating and/or measuring engine operating conditions. These may include, for example, vehicle speed, engine speed, engine load, accelerator pedal position, operator torque demand, ambient conditions including ambient temperature, humidity, and pressure, boost, EGR, manifold pressure, manifold air flow, etc. The operator torque demand may be based on accelerator pedal position and vehicle speed. For example, accelerator pedal position and vehicle speed may be a basis for indexing a table or function in controller memory. The table or function outputs an operator requested engine torque from empirically determined values stored in the table.

At 804, a target induction ratio or desired engine cylinder firing fraction may be selected based on the engine operating conditions. For example, as the operator torque demand decreases, the number of cylinders that needs to be fired to meet the torque demand may be reduced, and the number of cylinders that may be skipped (that is, operated with fuel selectively deactivated) while meeting the torque demand may be increased.

As used herein, the desired engine cylinder firing fraction (or target induction ratio) refers to the ratio of a total number of cylinder events that are inducting divided by the total number of cylinder compression strokes over a predetermined actual total number of cylinder compression strokes. In one example, the desired engine cylinder firing fraction is determined from the requested engine torque. In particular, allowable engine cylinder firing fraction values may be stored in a table or function that may be indexed by desired engine torque and engine speed. Engine cylinder firing fraction values that may provide the requested engine torque may be part of a group of available engine cylinder firing fraction values. Then, based on other vehicle operating conditions, desired engine cylinder firing fractions may be eliminated from the group of available engine cylinder firing fraction values. For example, some engine cylinder firing fractions may be removed from the group if the cylinder firing fractions provide higher levels of engine vibration. Then, the engine cylinder firing fraction that provides the fewest number of active engine cylinders during a cycle may be selected from the group of available engine cylinder firing fraction values to provide the desired engine cylinder firing fraction. In this way, a single desired engine cylinder firing fraction may be selected from a group of a large number of engine cylinder firing fractions. It will be appreciated that the selected engine cylinder firing fraction may then be provided via stationary or non-stationary cylinder deactivation patterns.

At 806, a decision is made for the next cylinder event and it is determined whether to inductor skip the cylinder in the upcoming cylinder event so as to support the desired induction ratio. The decision is made in accordance with the prior induction history of the engine and the desired induction ratio. If the induction ratio is held constant for a long time, the resulting decisions will deliver the pattern that corresponds to the induction ratio. In other words, the controller makes a decision to fire or skip at the next cylinder event so to provide the determined target induction ratio. In one example, if the most recent cylinder event was a firing event, and if the target induction ratio requires the next cylinder event to be an inducting event, the next cylinder is inducted and fired. Else, if the target induction ratio requires the next cylinder event to be a skipped event, the next cylinder is skipped and not fired. In some examples, a cylinder deactivation pattern that provides the target induction ratio or desired engine cylinder firing fraction may also be selected. However, by focusing on making a decision for only the next cylinder event, instead of determining the pattern, the need for getting into specific patterns is reduced. This enables the air charge estimation to be performed in a simpler manner, with less computation intensity.

At 808, the method includes selecting a cylinder for air charge estimation. For example, the next cylinder in the firing order may be identified and selected for air charge estimation. As such, air charge estimation may be performed before an induction event in each cylinder. At 810, it may be determined if the selected cylinder is active or not. For example, based on the selected cylinder deactivation pattern (and the reference cylinder identity, where applicable), it may be determined if the selected cylinder is active (will fire on the upcoming event) or deactivated (will not fire on the upcoming event). If the next cylinder in the firing order is determined to be a cylinder that is skipped according to the cylinder deactivation pattern, then at 812, the method includes setting the air charge estimate for the given cylinder to 0. In addition, the controller may send a control signal to actuators coupled to the valves and fuel injectors of the given cylinder to selectively deactivate fuel to the cylinder and disable valve operation with the intake valve disabled (e.g. in the intake stroke) before the exhaust valve is disabled (e.g., in the exhaust stroke). The routine then moves to 820.

Returning to 810, if the next cylinder in the firing order is determined to be a cylinder that is fired according to the cylinder deactivation pattern, then at 814, the method includes determining if the given cylinder was fired or skipped in the immediately previous engine cycle. For example, if the target induction ratio selected was 1/2, then a stationary pattern may have been selected and the firing cylinder is determined to have also fired in the immediately previous engine cycle (see, for example, pattern 300 of FIG. 3). As another example, if the target induction ratio selected was 1/3, then a non-stationary pattern may have been selected and the firing cylinder is determined to have been skipped in the immediately previous engine cycle (see, for example, pattern 310 of FIG. 3).

Based on the induction history of the cylinder, including the induction state of the cylinder on the immediately previous engine cycle, the controller may adjust an air charge estimate for the cylinder for the current engine cycle. In particular, the controller may select between estimating the amount of air charge entering the cylinder in accordance with a first or a second air charge characterization.

If the cylinder is active on the current engine cycle and was active on the immediately previous engine cycle (fire-fire scenario), then at 816, the method includes estimating the amount of air entering the cylinder in accordance with a first aircharge characterization/calibration. The first aircharge characterization is based on the currently firing cylinder having a previous induction state that is a first (firing) induction state. The first air charge characterization may have been mapped in accordance with the induction history of the cylinder being a stationary pattern where a given cylinder is repeatedly fired. The second air charge characterization may have been mapped in accordance with the induction history of the cylinder being anon-stationary pattern where a given cylinder is intermittently fired such that each firing event of a cylinder on a given engine cycle is preceded by a skipped firing event of the (same) cylinder on an immediately previous engine cycle.

During cylinder deactivation, an intake valve of the cylinder is deactivated before the exhaust valve is deactivated. During the reactivation, the intake valve of the cylinder is reactivated before the exhaust valve is reactivated. In the case where the cylinder fired in the previous cycle and is firing in the current cycle, the presence of two consecutive fires results in the intake and exhaust valves of the cylinder being open at the same time, resulting in exhaust residuals reaching the intake runner. As a result, a larger amount of residuals are held in the intake runner which are then drawn back into the cylinder during the next cylinder induction event. As a result, the amount of fresh air drawn into the cylinder during the next induction event is reduced, and the net amount of residuals in the air charge (trapped charge) is increased. An example of a first aircharge characterization for an induction ratio of 1/2 is shown at plot 602 of FIG. 6 and plot 706 of FIG. 7. It will be appreciated that other stationary patterns, such as for induction ratios of 1 and 1/4 may follow the same first characterization (along plot 602 of FIG. 6 and/or plot 706 of FIG. 7). Based on the trapped charge amount, the controller may estimate an air flow to the cylinder at the given intake manifold pressure. The first aircharge characterization may have been mapped for a stationary pattern, such as a pattern corresponding to an induction ratio of 1/2.

If the cylinder is active on the current engine cycle and was skipped on the immediately previous engine cycle (skip-fire scenario), then at 818, the method includes estimating the amount of air entering the cylinder in accordance with a second aircharge characterization/calibration, different from the first aircharge characterization or calibration. The second aircharge characterization is based on the currently firing cylinder having a previous induction state as skipped. In the case where the cylinder was skipped in the previous cycle and is firing in the current cycle, due to the order of valve deactivation and reactivation, the intake and exhaust valves are not open at the same time. As a result, there may be no blow-back of exhaust residuals into the intake runner and the net amount of residuals in the air charge (trapped charge) may be lower in this case relative to the fire-fire scenario. In other words, a relatively higher amount of fresh air may be drawn into the cylinder during an induction event. An example of a second aircharge characterization for an induction ratio of 1/3 is shown at plot 606 of FIG. 6 and for an induction ratio of 1/3 is shown at plot 604 of FIG. 6. Based on the trapped charge amount, the controller may estimate an air flow to the cylinder at the given intake manifold pressure as the amount of residuals retained in the cylinder increases, the second aircharge characterization may increase an amount of fresh airflow directed to the cylinder (such as relative to an ideal aircharge estimate), albeit at a lower rate than during the first characterization. The second aircharge characterization may have been mapped for a non-stationary pattern, such as a pattern corresponding to an induction ratio of 1/3. Thus the second characterization may be further based on the ratio of the number of FF events compared to the total events, or the number of skipped events that have elapsed in a cylinder since a last firing event in the cylinder.

From each of 812, 816, and 818, the method moves to 820 to adjust cylinder fueling based on the updated air charge estimate. For example, cylinder fueling may be increased (e.g., by increasing a pulse width signal commanded by the controller to a cylinder fuel injector) to compensate for the increased air flow to a given cylinder.

At 822, the method includes updating one or more additional engine operating parameters based on the updated air charge estimate for the given cylinder. The updating may include, for example, adjusting a spark timing for the given cylinder based on the updated air charge or residual gas fraction for the given cylinder, and/or adjusting a split ratio of fuel delivered to the cylinder via port injection relative to direct injection. Further still, the position of a throttle coupled to an intake runner of the given cylinder may be adjusted.

At 824, the method includes selecting another cylinder for air charge estimation. For example, the next cylinder in the firing order may be selected for air charge estimation. The controller may then return to 810 to reiterate the air charge estimation for the next cylinder, and so on until all cylinders are estimated. It will be appreciated that the above methods do not need to know the entire pattern corresponding to an induction ratio. In other words, the firing decisions can evolve on an event to event basis. The previous descriptions with induction pattern are provided to highlight the characterization process and explain the concept.

It will be appreciated that while the above method describes estimating the cylinder air charge on an event by event basis, in still other examples, the air charge estimation may be performed using a mean value model. For example, the throttle in the intake manifold can be used to modify the intake manifold pressure based upon the average flow through the engine. Therein a static function is used to capture the relationship between pressure and flow in a cylinder based upon the characteristics of the pattern corresponding to an induction ratio.

Consider an induction ratio of 2/3 wherein each cylinder fires twice before it is skipped once (firing pattern in a given cylinder is S-F-F-S-F-F-S). Therefore each firing cylinder spends half the time firing in FF mode (fire-fire) and the remaining half firing in SF mode (S-F). Therefore, as discussed earlier with reference to FIG. 6, the second air charge characterization for an induction ratio of 2/3 (e.g., plot 604 of FIG. 6) is proportioned between the first air charge characterization for an induction ratio of 1/2 (FF mode) (e.g., plot 602 of FIG. 6) and the second air charge characterization for an induction ratio of 1/3 (SF mode) (e.g., plot 606 of FIG. 6). For this case, the proportioning between the two curves can be depicted by the equation:

$$f = 0.5 f_{FF} + (1-0.5) f_{SF}.$$

Now, generalizing this relationship, we have the following equations:

$$W_{FF} = f_{FF}(P_m)$$

$$W_{SF} = f_{FF}(P_m)$$

$$W_{cyl} = f(P_m)$$

$$f(P_m) = \alpha f_{FF}(P_m) + (1-\alpha) f_{SF}(P_m)$$

where $$\alpha = \frac{\sum (\text{\# of FIRE events preceeded by a Fire event})}{\sum \text{\# of Fire events}}$$

and is a function of firing density, and $W_{cyl}$ is the average aircharge for the active cylinders corresponding to the intake pressure $P_m$.

The key induction ratios and corresponding values of $\alpha$ for a V8 are then determined. For induction ratios resulting in a stationary pattern, the value of $\alpha$ is 1. The induction ratios resulting in stationary pattern are 1/8, 1/4, 3/8, 1/2, 5/8, 3/4, 7/8, and 1. For an induction ratio of 2/3, the value of $\alpha$ is 0.5. For an induction ratio of 1/3, the value of $\alpha$ is 0. For induction ratios less than 1/8, the value of $\alpha$ is 0.

A controller may populate an air charge calibration table in this manner using the numbers and induction ratios given above. The values for the induction ratios not listed above could be obtained using interpolation. For a more-precise implementation, the controller may generate a table analytically to populate additional intermediate variables by numerically calculating the average over multiple cycles. The value will depend upon the duration of the cycles and can be selected based upon calibration requirement.

An example of this approach is shown with reference to FIG. 10 wherein map 1000 is generated numerically by using a corresponding induction ratio pattern and then calculating an average over multiple cycles. Map 1000 depicts firing density or induction ratio along the x axis and fraction of firing events that are FF along the y axis. The maps can analytically be derived by averaging over more than 8 or 10 cycles. Using this map and the first and second air charge characteristics, the steady state average of aircharge estimate may be calculated. For example, using map 1000, a controller may determine a proportion of firing events of a cylinder that include a firing event preceded by another firing event. As the proportion increases, the weightage of the second characterization (relative to the first air charge characterization) may be increased. In other words, as the proportion of FF events increases, air charge estimation may be blended further towards plot 704 of FIG. 7, as compared to plot 706.

Further still, the controller may determine the air charge estimate for a cylinder by using a weighted transfer function to proportion between the first and second air charge characterizations, thereby blending the two characterizations. A weightage of the first air charge characterization relative to the second air charge characterization may be selected based on an induction pattern of the cylinder used to achieve a target induction ratio. The weightage assigned to each air charge characterization may be derived analytically as a function of the induction ratio. For example, the weightage of the first air charge characterization may be higher when the firing pattern of the cylinder is a stationary pattern. When the firing pattern of the cylinder is a non-stationary pattern, the weightage of the second air charge characterization may be increased relative to the weightage of the first air charge characterization as a number of skipped events of the cylinder before a firing event of the cylinder increases. For example, for induction ratios having a stationary pattern, the transfer function may assign a higher weight to the first air charge characterization and a lower weight to the second air charge characterization. In comparison, for induction ratios having a non-stationary pattern, the transfer function may assign a higher weight to the second air charge characterization and a lower weight to the first air charge characterization, with the weightage assigned to the second air charge characterization increased as the number of cylinder events skipped prior to a firing event in a given cylinder increases. As another example, the weightage assigned to the first air charge characterization may increase as the number of FF type events (or fraction of total events that are FF events)

increases compared to the number of SF type events (or fraction of total events that are SF events) for a given induction ratio.

In still further examples, the air charge estimate may be further adjusted based on a difference between engine cycle averaged intake manifold pressure and an estimated intake manifold pressure. The estimated intake manifold pressure may be measured at bottom dead center of an intake stroke of the cylinder or estimated using a manifold filling and emptying model that uses the induction history to determine a variation in the intake manifold pressure from a mean value. Further still, an instantaneous manifold pressure estimated at IVC may be used to further enhance the air charge characterization. As such, the instantaneous intake manifold pressure can be different from a cycle average intake manifold pressure. The difference may depend on whether the given cylinder was fired or skipped in the previous cylinder event. This may affect the dilution at TDC. The difference may further depend on whether the subsequent two cylinder events (for other cylinders) are expected to be skipped or fired. This may affect the amount of air trapped at BDC.

Figure 11:
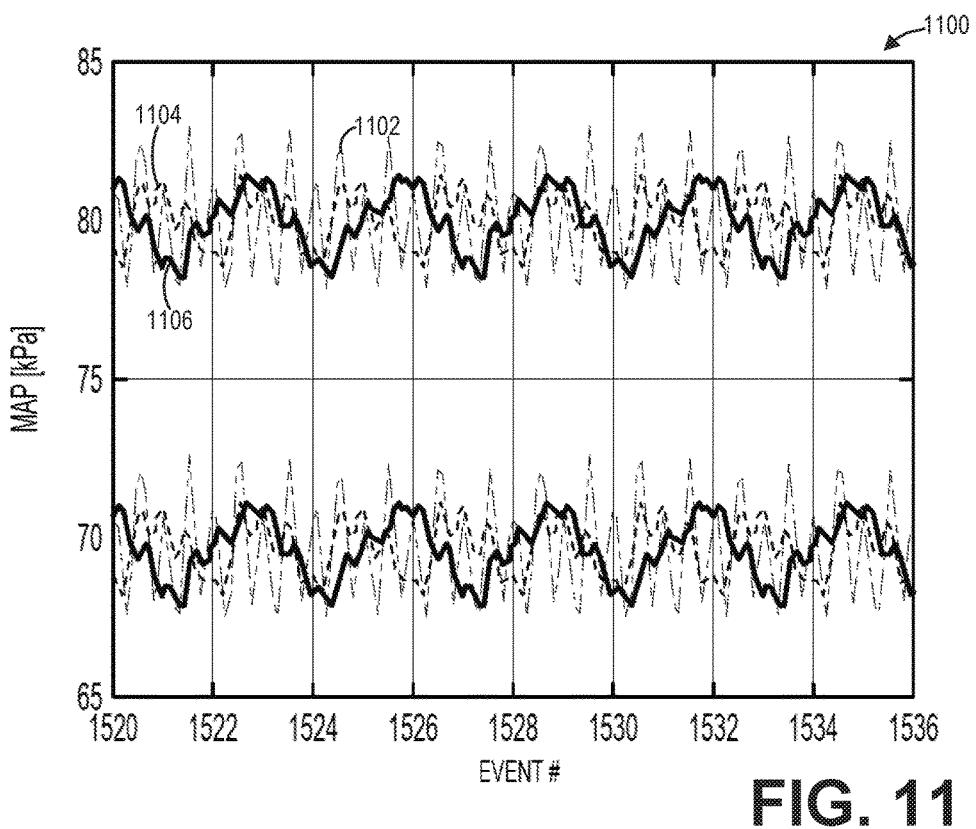
FIG. 11 shows an example map of the effect of induction history of a cylinder on the instantaneous intake manifold pressure estimate for the cylinder (for two different intake manifold pressure levels).

An example of this variation is shown at map 1100 of FIG. 11. Map 1100 depicts engine event number along the x-axis. Consecutive engine event numbers correspond to consecutive cylinder events in a firing order of the engine. Instantaneous intake manifold pressure (MAP) is depicted along the y-axis. Two different MAP levels are shown.

Plot 1102 (large dashed line) depicts the change in instantaneous MAP for each cylinder event when operating with all cylinders firing (induction ratio of 1). Plot 1104 (small dashed line) depicts the change in instantaneous MAP for each cylinder event when operating with half the cylinders firing with a stationary pattern (induction ratio of 1/2). Plot 1106 (solid line) depicts the change in instantaneous MAP for each cylinder event when operating with a third of the cylinders firing with a non-stationary pattern (induction ratio of 1/3). The figure elaborates that the variation in the intake manifold pressure changes with the induction pattern corresponding to the induction ratio. If a cylinder is inducting, then the intake manifold pressure will experience a drop whereas if a cylinder is skipping, then the intake manifold pressure will experience a rise. The flow through the throttle will be comparatively constant and hence a manifold filling model can be used to track the filling and emptying of the manifold in the presence of the fire and skip events. Such a model will then allow predicting of the instantaneous intake manifold pressure.

Given the instantaneous pressures, the controller may use the pressures estimated at IVC to further enhance the air charge calculations, and improve the event based calculations. In particular, the controller may measure or estimate a difference between the mean (or cycle average) intake manifold pressure and the intake manifold pressure at bottom dead center. This can be achieved by using a manifold filling model where the outflow of the manifold depends upon the aircharge and is zero for the case where the cylinder is not inducting. This allows the air charge characterization to be compensated for intake side interference caused by succeeding events (interfering cylinders).

In still further examples, cylinder wall temperature may be estimated and may be used to further enhance the air charge characterization. For example, after adjusting the air charge estimate in accordance with the first or the second air charge characterization, the air charge estimate may be further adjusted via a transfer function based on cylinder valve temperature. Therein the air charge estimate may be increased as the cylinder valve temperature decreases, the cylinder valve temperature decreased as a number of engine cycles elapsed since a last firing of the cylinder increases (that is, as the number of skipped events prior to a firing event for a given cylinder increases). The cylinder wall temperature effect may be quantified by operating the engine at an induction ratio of 0.5. This will result in a stationary pattern where every other cylinder will be deactivated. After a few cycles, the controller may shift the pattern by 1 event. This will cause the active cylinders to be deactivated and deactivated cylinders to be reactivated. The controller may then measure a change in the wall temperature or a decrease in the air flow. The controller may then generate a transfer function between the number of cycles a cylinder is deactivated for to the wall temperature or air charge correction.

For example, with reference to FIG. 7, as the number of skipped cylinder events preceding a cylinder firing event increases, causing the cylinder temperature to further decrease, the air charge characterization may be blended to reduce the weightage of the first characterization, and to weight the air charge estimation further towards a base value (depicted at plot 702) that includes the ideal volumetric efficiency mapping.

In this way, an engine controller may adjust an aircharge estimate for a cylinder by a first amount via a first aircharge calibration responsive to a the cylinder firing during a current engine cycle and an immediately previous engine cycle while adjusting the aircharge estimate by a second amount via a second aircharge calibration responsive to the cylinder firing during the current engine cycle and not firing during at least the immediately previous engine cycle. The controller may further adjust fuel injection to the cylinder on the current cycle based on the adjusted air charge estimate. As used herein, the cylinder not firing includes fuel and spark being selectively deactivated to the cylinder while cylinder intake and exhaust valves continue to operate, the cylinder intake valve opened before the cylinder exhaust valve when the cylinder is firing, the cylinder intake valve closed before the cylinder exhaust valve when the cylinder is not firing. The controller may fire the cylinder according to one of a plurality of firing patterns selected based on operator torque demand and engine NVH, the plurality of firing patterns including a stationary pattern and a non-stationary pattern. The first aircharge calibration is mapped based on the stationary pattern while the second aircharge calibration is mapped based on the non-stationary pattern. The second amount of air charge adjustment may be varied as one or more of a number of engine cycles elapsed since a last firing of the cylinder increases, an estimated cylinder wall temperature decreases, and a difference between a mean intake manifold pressure of the cylinder during cylinder firing and an instantaneous intake manifold pressure of the cylinder at intake stroke BDC increases.

An example engine operation with cylinder air flow estimation adjusted based on the cylinder's firing history is shown with reference to FIG. 9. Map 900 depicts operator torque demand at plot 902, an induction ratio (or cylinder firing fraction) at plot 904, cylinder firing decision at plot 906, cylinder number for each cylinder event at plot 908, estimated cylinder air amount at plot 910, and cylinder fuel injection amount at plot 912. The depicted example is for an eight cylinder four stroke engine (with cylinders 1-8) having a firing order (or order of combustion) of 1, 3, 7, 2, 6, 5, 4, 8. All plots are depicted over engine event number (along the x-axis). An engine event may be a stroke of a cylinder occurring (e.g., intake, compression, power, exhaust), an intake or exhaust valve opening or closing time, time of ignition of an air-fuel mixture in the cylinder, a position of a piston in the cylinder with respect to the crankshaft position, or other engine related event. The engine event number corresponds to a particular cylinder. In the current example, engine event number one corresponds to a compression stroke of cylinder number one, engine event number two corresponds to a compression stroke of cylinder number three, and so on. In plot 908, cylinder events are shown in their firing order. If a particular cylinder in the firing order is fired, it shown at plot 908 as a solid circle. If a particular cylinder in the firing order is skipped, it is shown at plot 908 as a dashed circle. Plot 906 depicting the firing decision is reflective of a selected firing pattern wherein a cylinder activation event (e.g., firing with intake and exhaust valves opening and closing during a cycle of the cylinder) is represented by a filled circle and a cylinder deactivation event (e.g., not firing with intake and exhaust valves held closed during a cycle of the cylinder) is indicated by an empty circle. The decision to activate or deactivate a cylinder and open and close the cylinder's intake and exhaust valve may be made a predetermined number of cylinder events (e.g., one cylinder event, or alternatively, one cylinder cycle or eight cylinder events for an eight cylinder engine) before the cylinder is to be activated or deactivated to allow time to begin the process of opening and closing intake and exhaust valves of the cylinder being evaluated. For example, for an eight cylinder engine with a firing order of 1, 3, 7, 2, 6, 5, 4, 8, the decision to activate or deactivate cylinder number seven may be made during an intake or compression stroke of cylinder number seven one engine cycle before cylinder number seven is deactivated. Alternatively, the decision to activate or not activate a cylinder may be made a predetermined number of engine events or cylinder events before the selected cylinder is activated or deactivated. The cylinder on its compression stroke at the time corresponding to the event number is activated when the firing decision is indicated by the filled circle (and the firing decision value is at 1). The cylinder on its compression stroke at the time corresponding to the event number is not activated when the firing decision is indicated by the empty circle (and the firing decision value is at zero). At any given time, a cylinder charge estimation is performed in accordance with a first or a second air charge characterization, based on an order of firing events.

For the first engine cycle (first eight engine events), the torque demand is high. To meet the torque demand, all cylinders are fired in accordance with their firing order. Thus the first event of the engine cycle includes the firing of cylinder 1, followed by the firing of cylinder 3, then cylinder 7 and so on to provide the firing order 1-3-7-2-6-5-4-8. Since each cylinder firing event is preceded by another cylinder firing event, the air charge for each cylinder is estimated using the first air-charge characterization and cylinder fueling is adjusted as a function of the air charge estimate to operate the cylinders at a target air-fuel ratio (such as at or around stoichiometry). At this time, the induction ratio of the engine cylinders is 1. The first air charge characterization may include an amount of air charge added (via a multiplier or an adder or an alternate function) to a base air charge estimate (e.g., based on an ideal curve). The air estimated via the first air charge characterization may account for the smaller amount of air inducted into a cylinder due to blowback of exhaust residuals into an intake runner of the cylinder during a preceding firing event, the exhaust residuals then being inducted back into the cylinder during an intake stroke of an immediately subsequent firing event. At the end of the first engine cycle (around engine event 8), there is a drop in operator torque demand. An engine controller may decide to deactivate cylinders according to a stationary pattern where every alternate cylinder is fired so as to provide an induction ratio of 0.5 (1/2). By operating the engine with fewer cylinders firing, the average air flow to each cylinder may be increased, increasing the pumping efficiency of each firing cylinder. At the same time, fuel economy can be improved. For the next two engine cycles (16 engine events), the engine is operated with a cylinder firing pattern where cylinders 1, 7, 6, and 4 are fired and cylinders 3, 2, 5, and 8 are skipped. Due to the stationary pattern, the same cylinders are fired on each of the two engine cycles and the same cylinders are skipped on each of the two engine cycles. During the estimation of air charge, the first air charge characterization may continue to be applied due to each of the firing cylinders having also fired in the immediately previous engine cycle. Fueling for each of the firing cylinders is then adjusted as a function of air charge estimate.

At the end of the third engine cycle (after 24 engine events are completed), there is a further drop in operator torque demand. The engine controller may decide to change the cylinder deactivation pattern to a pattern where more cylinders are deactivated due to fewer active cylinders being required to meet the reduced torque demand. In particular, the cylinders are deactivated according to a non-stationary pattern where one cylinder is fired every three cylinder events so as to provide an induction ratio of 0.33 (1/3). By operating the engine with fewer cylinders firing, the average air flow to each cylinder may be increased, increasing the pumping efficiency of each firing cylinder. At the same time, fuel economy can be improved. For the next four engine cycles (32 engine events), the engine is operated with a cylinder firing pattern where one cylinder is fired and then the next two cylinders in the firing order are skipped. Due to the non-stationary pattern, the cylinders that are fired and skipped on each engine cycle vary. On the first engine cycle where the engine is operated with the induction ratio of 0.33 (engine events 25-32), cylinders 1, 2, and 4 are fired while cylinders 3, 7, 6, 5, and 8 are skipped. On the next engine cycle, cylinders 3, 6, and 8 are fired while cylinders 1, 7, 2, 5, and 4 are skipped. On the subsequent engine cycle, cylinders 7, 5, and 1 are fired while cylinders 1, 3, 2, 6, 4, and 8 are skipped. On the next engine cycle, cylinders 1, 2, and 4 are fired again while cylinders 3, 7, 6, 5, and 8 are skipped again (like in the first cycle of operation at induction ratio of 0.33). During the estimation of air charge for the firing cylinders, the air charge estimate may be determined with one of the first and a second air charge characterization, the air charge characterization selected based on the firing history of the given cylinder. For example, on the first engine cycle (of operating at 0.33 induction ratio) where cylinders 1, 2, and 4 are fired, air flow to cylinders 1 and 4 is estimated using the first air charge characterization due to each of those cylinders having also fired in the immediately previous engine cycle (while operating at 0.5 induction ratio). In comparison, air flow to cylinder 2 is estimated using a second air charge characterization due to cylinder 2 having not fired in the immediately previous engine cycle (while operating at 0.5 induction ratio).

The second air charge characterization may include an amount of air charge added (via a multiplier or an adder or an alternate function) to a base air charge estimate (e.g., based on an ideal curve). The air estimated via the second air charge characterization may account for the larger amount of air inducted into a cylinder during an intake stroke as a result of a lower amount of residual gas being retained in a clearance volume of a cylinder. In the depicted example, the additional air inducted into the cylinder due to the second air charge characterization is represented by a filled rectangle. The filled rectangle represents air added in excess of an air charge estimated based on the first characterization (depicted via the blank rectangle). On the second engine cycle (of operating at 0.33 induction ratio) where cylinders 3, 6, and 8 are fired, air flow to each of the firing cylinders is estimated using the second air charge characterization due to each of those cylinders having been skipped in the immediately previous engine cycle (while operating at 0.33 induction ratio). Further, the second air charge characterization for cylinders 3 and 8 may include a relatively larger amount of excess air due to the cylinders being skipped on the two previous engine cycles, while the second air charge characterization for cylinder 6 may include a relatively smaller amount of excess air due to the cylinder being skipped on the previous engine cycle but having been fired on the engine cycle before that. On the third engine cycle (of operating at 0.33 induction ratio) where cylinders 7 and 5 are fired, air flow to each of the firing cylinders is estimated using the second air charge characterization due to each of those cylinders having been skipped in the immediately previous engine cycle (while operating at 0.33 induction ratio). Further, the second air charge characterization for cylinders 7 and 5 may include a relatively larger amount of excess air due to the cylinders being skipped on the two previous engine cycles. On the next three engine events (of operating at 0.33 induction ratio), cylinder 1 is fired while cylinders 3 and 7 are skipped, and air flow to the firing cylinder is estimated using the second air charge characterization due to the cylinders having been skipped fired in the immediately previous engine cycle (while operating at 0.33 induction ratio). Fueling for each of the firing cylinders while operating at induction ratio at 0.33 is adjusted as a function of the air charge estimate (with the fuel injection amount represented by the hatched rectangle in each fuel injection rectangle representing the fuel injection amount added based on the presence of excess air).

Around engine event number 52, there is a rise in operator torque demand. The engine controller may decide to reactivate all the cylinders due to more active cylinders being required to meet the elevated torque demand. In particular, all the cylinders are reactivated so that each cylinder is fired every engine event thereafter so as to provide an induction ratio of 1. Since the reactivation is commanded when cylinder 7 was being skipped, the first cylinder to fire upon reactivation is cylinder 2 (in accordance with the firing order), followed by cylinder 6 and 5, in that order. During the estimation of air charge for firing cylinders 2 and 6, air charge is estimated with the second air charge characterization due to each of those firing cylinders having been skipped in the immediately previous engine cycle. During the estimation of air charge for firing cylinder 5, the air charge is estimated with the first air charge characterization due to the firing cylinders having been fired in the immediately previous engine cycle. Fueling for each of the firing cylinders is then adjusted as a function of the air charge estimate (with the fuel injection amount represented by the hatched rectangle in each fuel injection rectangle representing the fuel injection amount added based on the presence of excess air).

In this way, a method for an engine that is executed by a controller may include estimating an amount of air entering a cylinder responsive to one of two air charge characterizations for the cylinder and a last previous induction state of the cylinder and injecting fuel to the cylinder in response to the amount of air entering the cylinder. The one of two air charge characterizations may be based on the last previous induction state of the cylinder while the other of the two air charge characterizations is based on a different induction state of the cylinder. The last previous induction state may include the cylinder firing and positive valve overlap between an open intake valve of the cylinder during a current engine cycle and an open exhaust valve of the cylinder during an immediately previous engine cycle, wherein the one of the two air charge characterizations decreases the amount of air to the cylinder in accordance with a first factor based on exhaust residuals blown back into an intake runner of the cylinder during the positive valve overlap. The different induction state of the cylinder may include the cylinder not firing and no valve overlap between an open intake valve of the cylinder during a current engine cycle and a closed open exhaust valve of the cylinder during an immediately previous engine cycle, wherein the other of the two air charge characterizations decreases the amount of air to the cylinder in accordance with a second factor based on exhaust residuals retained in the cylinder during the no valve overlap, the second factor smaller than the first factor. Further, the controller may adjust one or more engine operating parameters in response to the adjusted air charge estimate, the one or more engine operating parameters including a spark ignition timing of the cylinder and a split ratio of fuel delivered via port injection relative to direct injection to the cylinder.

In this way, the accuracy of cylinder aircharge estimation may be improved, even when an engine is operating with rolling VDE. By adjusting an air flow to a cylinder based on whether the cylinder was fired or skipped in a preceding engine cycle, residuals trapped in the cylinder's clearance volume or blown back into the intake runner may be accounted for. Since the amount of residuals trapped or blow back affects the amount of fresh air inducted into the cylinder during a subsequent induction event, air flow to the cylinder may be better estimated. By adjusting the air flow to compensate for TDC interference caused by valve overlap events in a given cylinder, cylinder volumetric efficiency may be estimated more accurately, and without increased computation and memory requirements. By accounting for variations in air induction during cylinder deactivation as compared to during cylinder reactivation, trapped charge and cylinder temperature changes which affect volumetric efficiency may be calculated more reliably. As a result, deviations in cylinder-to-cylinder air-fuel ratio can be reduced. Overall, engine performance may be improved.

One example method for an engine comprises: adjusting an air charge estimate for a cylinder on a current engine cycle based on an induction history of the cylinder, including an induction state of the cylinder on an immediately previous engine cycle; and injecting fuel to the cylinder in response to the adjusted air charge estimate. In the preceding example, additionally or optionally, the adjusting includes estimating an amount of air charge entering the cylinder responsive to a first air charge characterization when the cylinder is fired on the current engine cycle and fired on the immediately previous engine cycle, and estimating the amount of air charge entering the cylinder responsive to a second, different air charge characterization when the cylinder is fired on the current engine cycle and skipped on the immediately previous engine cycle. In any or all of the preceding examples, additionally or optionally, intake and exhaust valves of the cylinder operate with positive valve overlap at top-dead-center of exhaust stroke of the previous engine cycle when the cylinder is fired on the current engine cycle and fired on the immediately previous engine cycle, and wherein the first air charge characterization includes decreasing cylinder air charge from a base value by a first amount to compensate for a relatively higher blow-back of exhaust into an intake runner of the cylinder, the base value based on an ideal volumetric efficiency mapping. In any or all of the preceding examples, additionally or optionally, intake and exhaust valves of the cylinder operate with no valve overlap at top-dead-center of exhaust stroke of the previous engine cycle when the cylinder is fired on the current engine cycle and skipped on at least the immediately previous engine cycle, and wherein the second air charge characterization includes decreasing cylinder air charge from the base value by a second amount to compensate for a relatively lower blow-back of the exhaust gases into the intake runner. In any or all of the preceding examples, additionally or optionally, when the cylinder is fired on the current engine cycle, the intake valve of the cylinder is activated open before the exhaust valve is activated open and wherein when the cylinder is skipped on the current engine cycle, the intake valve of the cylinder is deactivated before the exhaust valve is deactivated, and fuel is selectively deactivated. In any or all of the preceding examples, additionally or optionally, the second amount is smaller than the first amount at a given manifold pressure, and wherein the second amount is adjusted based on the induction history of the cylinder including a fraction of firing events in the cylinder that are immediately preceded by a firing event in the cylinder, the second amount decreased as the fraction increases. In any or all of the preceding examples, additionally or optionally, the first air charge characterization is mapped in accordance with the induction history of the cylinder being a stationary pattern of cylinder deactivation, and wherein the second air charge characterization is mapped in accordance with the induction history of the cylinder being a non-stationary pattern of cylinder deactivation, wherein the cylinder is repeatedly fired in the stationary pattern, and wherein the cylinder is intermittently fired in the non-stationary pattern such that each firing cylinder event is preceded by a skipped event for a given cylinder in a previous engine cycle. In any or all of the preceding examples, additionally or optionally, the adjusting includes estimating an amount of air charge entering the cylinder responsive to each of a first air charge characterization and a second air charge characterization, a weightage of the first air charge characterization relative to the second air charge characterization selected based on an induction pattern of the cylinder used to achieve an induction ratio. In any or all of the preceding examples, additionally or optionally, the weightage of the first air charge characterization is higher when the firing pattern of the cylinder is a stationary pattern, and wherein when the firing pattern of the cylinder is a non-stationary pattern, the weightage of the second air charge characterization increased relative to the weightage of the first air charge characterization as a proportion of firing events in the cylinder that are preceded by a firing event in the cylinder increases. In any or all of the preceding examples, additionally or optionally, the adjusting is further based on a difference between engine cycle averaged intake manifold pressure for the cylinder and an estimated intake manifold pressure, the estimated intake manifold pressure measured at bottom dead center of an intake stroke of the cylinder or estimated using a manifold filling and emptying model that uses the induction history to determine a variation in the intake manifold pressure from a mean value. In any or all of the preceding examples, additionally or optionally, the aircharge estimate is further adjusted via a transfer function based on cylinder valve temperature, the air charge estimate increased as the cylinder valve temperature decreases, the cylinder valve temperature decreased as a number of engine cycles elapsed since a last firing of the cylinder increases.

Another example method for an engine comprises: adjusting an aircharge estimate for a cylinder by a first amount via a first aircharge calibration responsive to a the cylinder firing during a current engine cycle and an immediately previous engine cycle; and adjusting the aircharge estimate by a second amount via a second aircharge calibration responsive to the cylinder firing during the current engine cycle and not firing during at least the immediately previous engine cycle. In the preceding example, additionally or optionally, the method further comprises adjusting fuel injection to the cylinder on the current cycle based on the adjusted air charge estimate. In any or all of the preceding examples, additionally or optionally, the cylinder not firing includes fuel and spark being selectively deactivated to the cylinder while cylinder intake and exhaust valves operate without valve overlap, and wherein the cylinder firing includes fuel and spark being active while the cylinder intake and exhaust valves operate with valve overlap. In any or all of the preceding examples, the method additionally or optionally further comprises firing the cylinder according to one of a plurality of firing patterns selected based on operator torque demand and engine NVH, the plurality of firing patterns including a stationary pattern and a non-stationary pattern, and wherein the first aircharge calibration is mapped based on the stationary pattern and the second aircharge calibration is mapped based on the non-stationary pattern. In any or all of the preceding examples, additionally or optionally, the second amount is varied as one or more of a number of engine cycles elapsed since a last firing of the cylinder increases, a proportion of firing events in the cylinder preceded by a firing event in the given cylinder increases, an estimated cylinder wall temperature decreases, and a difference between a mean intake manifold pressure of the cylinder during cylinder firing and an instantaneous intake manifold pressure of the cylinder at intake stroke BDC increases. In any or all of the preceding examples, additionally or optionally, the aircharge estimate is further adjusted via a transfer function based on cylinder valve temperature, the air charge estimate increased as the cylinder valve temperature decreases, the cylinder valve temperature decreased as a number of engine cycles elapsed since a last firing of the cylinder increases.

Another example method for an engine comprises estimating an amount of air entering a cylinder responsive to one of two air charge characterizations for the cylinder and a last previous induction state of the cylinder; and injecting fuel to the cylinder in response to the amount of air entering the cylinder. In the preceding example, additionally or optionally, the one of two air charge characterizations is based on the last previous induction state of the cylinder, and where the other of the two air charge characterizations is based on a different induction state of the cylinder. In any or all of the preceding examples, additionally or optionally, the last previous induction state includes the cylinder firing and positive valve overlap between an open intake valve of the cylinder during a current engine cycle and an open exhaust valve of the cylinder during an immediately previous engine cycle, wherein the one of the two air charge characterizations decreases the amount of air to the cylinder at a given manifold pressure in accordance with a first factor based on exhaust residuals blown back into an intake runner of the cylinder during the positive valve overlap, wherein the different induction state of the cylinder includes the cylinder not firing and no valve overlap between an open intake valve of the cylinder during a current engine cycle and a closed open exhaust valve of the cylinder during an immediately previous engine cycle, and wherein the other of the two air charge characterizations decreases the amount of air to the cylinder at the given manifold pressure in accordance with a second factor based on exhaust residuals retained in the cylinder during the no valve overlap, the second factor smaller than the first factor. In any or all of the preceding examples, the method additionally or optionally further comprises adjusting one or more engine operating parameters in response to the adjusted air charge estimate, the one or more engine operating parameters including a spark ignition timing of the cylinder and a split ratio of fuel delivered via port injection relative to direct injection to the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting an air charge estimate for a cylinder on a current engine cycle based on an induction history of the cylinder, including an induction state of the cylinder on an immediately previous engine cycle; and
injecting fuel to the cylinder in response to the adjusted air charge estimate.

2. The method of claim 1, wherein the adjusting includes estimating an amount of air charge entering the cylinder responsive to a first air charge characterization when the cylinder is fired on the current engine cycle and fired on the immediately previous engine cycle, and estimating the amount of air charge entering the cylinder responsive to a second, different air charge characterization when the cylinder is fired on the current engine cycle and skipped on the immediately previous engine cycle.

3. The method of claim 2, wherein intake and exhaust valves of the cylinder operate with positive valve overlap at top-dead-center of exhaust stroke of the previous engine cycle when the cylinder is fired on the current engine cycle and fired on the immediately previous engine cycle, and wherein the first air charge characterization includes decreasing cylinder air charge from a base value by a first amount to compensate for a relatively higher blow-back of exhaust into an intake runner of the cylinder, the base value based on an ideal volumetric efficiency mapping.

4. The method of claim 3, wherein intake and exhaust valves of the cylinder operate with no valve overlap at top-dead-center of exhaust stroke of the previous engine cycle when the cylinder is fired on the current engine cycle and skipped on at least the immediately previous engine cycle, and wherein the second air charge characterization includes decreasing cylinder air charge from the base value by a second amount to compensate for a relatively lower blow-back of the exhaust gases into the intake runner.

5. The method of claim 4, wherein when the cylinder is fired on the current engine cycle, the intake valve of the cylinder is activated open before the exhaust valve is activated open and wherein when the cylinder is skipped on the current engine cycle, the intake valve of the cylinder is deactivated before the exhaust valve is deactivated, and fuel is selectively deactivated.

6. The method of claim 4, wherein the second amount is smaller than the first amount at a given manifold pressure, and wherein the second amount is adjusted based on the induction history of the cylinder including a fraction of firing events in the cylinder that are immediately preceded by a firing event in the cylinder, the second amount decreased as the fraction increases.

7. The method of claim 2, wherein the first air charge characterization is mapped in accordance with the induction history of the cylinder being a stationary pattern of cylinder deactivation, and wherein the second air charge characterization is mapped in accordance with the induction history of the cylinder being a non-stationary pattern of cylinder deactivation, wherein the cylinder is repeatedly fired in the stationary pattern, and wherein the cylinder is intermittently fired in the non-stationary pattern such that each firing cylinder event is preceded by a skipped event for a given cylinder in a previous engine cycle.

8. The method of claim 1, wherein the adjusting includes estimating an amount of air charge entering the cylinder responsive to each of a first air charge characterization and a second air charge characterization, a weightage of the first air charge characterization relative to the second air charge characterization selected based on an induction pattern of the cylinder used to achieve an induction ratio.

9. The method of claim 8, wherein the weightage of the first air charge characterization is higher when the firing pattern of the cylinder is a stationary pattern, and wherein when the firing pattern of the cylinder is a non-stationary pattern, the weightage of the second air charge characterization increased relative to the weightage of the first air charge characterization as a proportion of firing events in the cylinder preceded by a firing event in the cylinder increases.

10. The method of claim 1, wherein the adjusting is further based on a difference between engine cycle averaged intake manifold pressure for the cylinder and an estimated intake manifold pressure, the estimated intake manifold pressure measured at bottom dead center of an intake stroke of the cylinder or estimated using a manifold filling and emptying model that uses the induction history to determine a variation in the intake manifold pressure from a mean value.

11. The method of claim 1, wherein the aircharge estimate is further adjusted via a transfer function based on cylinder valve temperature, the air charge estimate increased as the cylinder valve temperature decreases, the cylinder valve temperature decreased as a number of engine cycles elapsed since a last firing of the cylinder increases.

12. A method for an engine, comprising:
adjusting an aircharge estimate for a cylinder by a first amount via a first aircharge calibration responsive to the cylinder firing during a current engine cycle and an immediately previous engine cycle; and
adjusting the aircharge estimate by a second amount via a second aircharge calibration responsive to the cylinder firing during the current engine cycle and not firing during at least the immediately previous engine cycle.

13. The method of claim 12, further comprising adjusting fuel injection to the cylinder on the current cycle based on the adjusted air charge estimate.

14. The method of claim 12, wherein the cylinder not firing includes fuel and spark being selectively deactivated to the cylinder while cylinder intake and exhaust valves operate without valve overlap, and wherein the cylinder firing includes fuel and spark being active while the cylinder intake and exhaust valves operate with valve overlap.

15. The method of claim 12, further comprising, firing the cylinder according to one of a plurality of firing patterns selected based on operator torque demand and engine NVH, the plurality of firing patterns including a stationary pattern and a non-stationary pattern, and wherein the first aircharge calibration is mapped based on the stationary pattern and the second aircharge calibration is mapped based on the non-stationary pattern.

16. The method of claim 12, wherein the second amount is varied as one or more of a number of engine cycles elapsed since a last firing of the cylinder increases, a proportion of firing events in the cylinder preceded by a firing event in the given cylinder increases, an estimated cylinder wall temperature decreases, and a difference between a mean intake manifold pressure of the cylinder during cylinder firing and an instantaneous intake manifold pressure of the cylinder at intake stroke BDC increases.

17. A method for an engine, comprising:
estimating an amount of air entering a cylinder responsive to one of two air charge characterizations for the cylinder and a last previous induction state of the cylinder; and
injecting fuel to the cylinder in response to the amount of air entering the cylinder.

18. The method of claim 17, wherein the one of two air charge characterizations is based on the last previous induction state of the cylinder, and where the other of the two air charge characterizations is based on a different induction state of the cylinder.

19. The method of claim 18, wherein the last previous induction state includes the cylinder firing and positive valve overlap between an open intake valve of the cylinder during a current engine cycle and an open exhaust valve of the cylinder during an immediately previous engine cycle, wherein the one of the two air charge characterizations decreases the amount of air to the cylinder at a given manifold pressure in accordance with a first factor based on exhaust residuals blown back into an intake runner of the cylinder during the positive valve overlap, wherein the different induction state of the cylinder includes the cylinder not firing and no valve overlap between an open intake valve of the cylinder during a current engine cycle and a closed open exhaust valve of the cylinder during an immediately previous engine cycle, and wherein the other of the two air charge characterizations decreases the amount of air to the cylinder at the given manifold pressure in accordance with a second factor based on exhaust residuals retained in the cylinder during the no valve overlap, the second factor smaller than the first factor.

20. The method of claim 17, further comprising adjusting one or more engine operating parameters in response to the adjusted air charge estimate, the one or more engine operating parameters including a spark ignition timing of the cylinder and a split ratio of fuel delivered via port injection relative to direct injection to the cylinder.

* * * * *